(12) United States Patent
Yasukochi

(10) Patent No.: US 11,203,149 B2
(45) Date of Patent: *Dec. 21, 2021

(54) THREE-DIMENSIONAL MODELING APPARATUS, OBJECT, AND METHOD OF MANUFACTURING AN OBJECT

(71) Applicant: Sony Corporation, Tokyo (JP)

(72) Inventor: Hiroyuki Yasukochi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/007,012

(22) Filed: Jun. 13, 2018

(65) Prior Publication Data
US 2018/0290379 A1 Oct. 11, 2018

Related U.S. Application Data

(63) Continuation of application No. 13/208,557, filed on Aug. 12, 2011, now Pat. No. 10,022,911.

(30) Foreign Application Priority Data

Aug. 19, 2010 (JP) .................................. 2010-183640

(51) Int. Cl.
*B29C 64/135* (2017.01)
*B29C 41/52* (2006.01)
(Continued)

(52) U.S. Cl.
CPC ............ *B29C 64/135* (2017.08); *B29C 41/52* (2013.01); *B29C 64/176* (2017.08);
(Continued)

(58) Field of Classification Search
CPC ... B29C 64/135; B29C 64/218; B29C 64/241; B29C 64/268; B29C 64/393; B29C 64/176; B29C 64/112; B33Y 30/00
See application file for complete search history.

(56) References Cited

U.S. PATENT DOCUMENTS 4,801,477 A 1/1989 Fudim
5,192,559 A 3/1993 Hull et al.
(Continued)

FOREIGN PATENT DOCUMENTS

CN 85102760 A 8/1986
CN 1503721 A 6/2004
(Continued)

OTHER PUBLICATIONS dictionary.com, for the term rigid: https://www.dictionary.com/browse/rigid?s=t.*

(Continued)

*Primary Examiner* — Leith S Shafi
*Assistant Examiner* — Inja Song
(74) *Attorney, Agent, or Firm* — Wolf, Greenfield & Sacks, P.C.

(57) ABSTRACT

Provided is a three-dimensional modeling apparatus including a stage, a constraining body, a supply nozzle, an irradiation unit, and a movement mechanism. The constraining body includes a surface including a linear region along a first direction, and is opposed to the stage so that the linear region is the closest to the stage. The supply nozzle supplies a material curable by energy of an energy ray into a slit region between the stage and the linear region. The irradiation unit irradiates the supplied material with the energy ray through the constraining body. The movement mechanism moves the stage relative to the constraining body along a second direction for forming a cured layer of the material for one layer, and moves the constraining body and the stage relative to each other along a stacking direction for stacking the cured layers.

19 Claims, 18 Drawing Sheets

(51) Int. Cl.
  *B33Y 30/00* (2015.01)
  *B29C 64/176* (2017.01)
  *B29C 64/218* (2017.01)
  *B29C 64/241* (2017.01)
  *B29C 64/268* (2017.01)
  *B29C 64/393* (2017.01)
  *B33Y 10/00* (2015.01)
  *B29C 64/25* (2017.01)

(52) U.S. Cl.
  CPC .......... *B29C 64/218* (2017.08); *B29C 64/241* (2017.08); *B29C 64/25* (2017.08); *B29C 64/268* (2017.08); *B29C 64/393* (2017.08); *B33Y 30/00* (2014.12); *B33Y 10/00* (2014.12); *Y10T 428/24479* (2015.01)

(56) References Cited

U.S. PATENT DOCUMENTS

| | | | |
|---|---|---|---|
| 5,617,911 A * | 4/1997 | Sterett | B05B 5/025 164/457 |
| 6,042,097 A | 3/2000 | Ikawa et al. | |
| 6,183,942 B1 | 2/2001 | Kim et al. | |
| 6,206,672 B1 | 3/2001 | Grenda | |
| 2006/0023129 A1 | 2/2006 | Motomatsu | |
| 2006/0249884 A1 | 11/2006 | Partanen et al. | |
| 2008/0206383 A1 | 8/2008 | Hull et al. | |
| 2009/0020919 A1 | 1/2009 | Marsac | |
| 2009/0184444 A1 | 7/2009 | Honda et al. | |
| 2009/0196946 A1 | 8/2009 | Kihara et al. | |
| 2009/0309267 A1 * | 12/2009 | Boot | B29C 64/135 264/496 |
| 2012/0045617 A1 | 2/2012 | Yasukochi | |
| 2015/0196138 A1 | 7/2015 | Juric | |
| 2017/0265849 A1 * | 9/2017 | Assaf | A61B 17/12136 |
| 2018/0071083 A1 * | 3/2018 | Fahl | A61F 2/20 |
| 2020/0147920 A1 * | 5/2020 | Cegalin | B32B 5/12 |

FOREIGN PATENT DOCUMENTS

| | | |
|---|---|---|
| CN | 1700980 A | 11/2005 |
| CN | 1933961 A | 3/2007 |
| CN | 101229685 A | 7/2008 |
| JP | 05-237942 A | 9/1993 |
| JP | 2000-263651 A | 9/2000 |
| JP | 2003-251701 A | 9/2003 |
| JP | 2004-223790 A | 8/2004 |
| JP | 2009-137048 A | 6/2009 |
| JP | 2009-543716 A | 12/2009 |
| JP | 2009-543717 A | 12/2009 |
| JP | 2010-036537 A | 2/2010 |
| JP | 2010-052318 A | 3/2010 |

OTHER PUBLICATIONS dictionary.com, for the term "elastic": https://www.dictionary.com/browse/nonelastic?s=t.*
U.S. Appl. No. 13/208,557, filed Aug. 12, 2011, Yasukochi.
Chinese Office Action dated Nov. 15, 2014 in connection with Chinese Application No. 201110234024.X, and English translation thereof.
Japanese Office Action dated Dec. 2, 2014 in connection with Japanese Application No. 2010-183640.
Japanese Office Action dated Mar. 4, 2014 in connection with Japanese Application No. 2010-183640.
Japanese Office Action dated May 10, 2016 in connection with Japanese Application No. 2015-133723.
Japanese Office Action dated Sep. 10, 2019 in connection with Japanese Application No. 2018-097816, and English translation thereof.

* cited by examiner

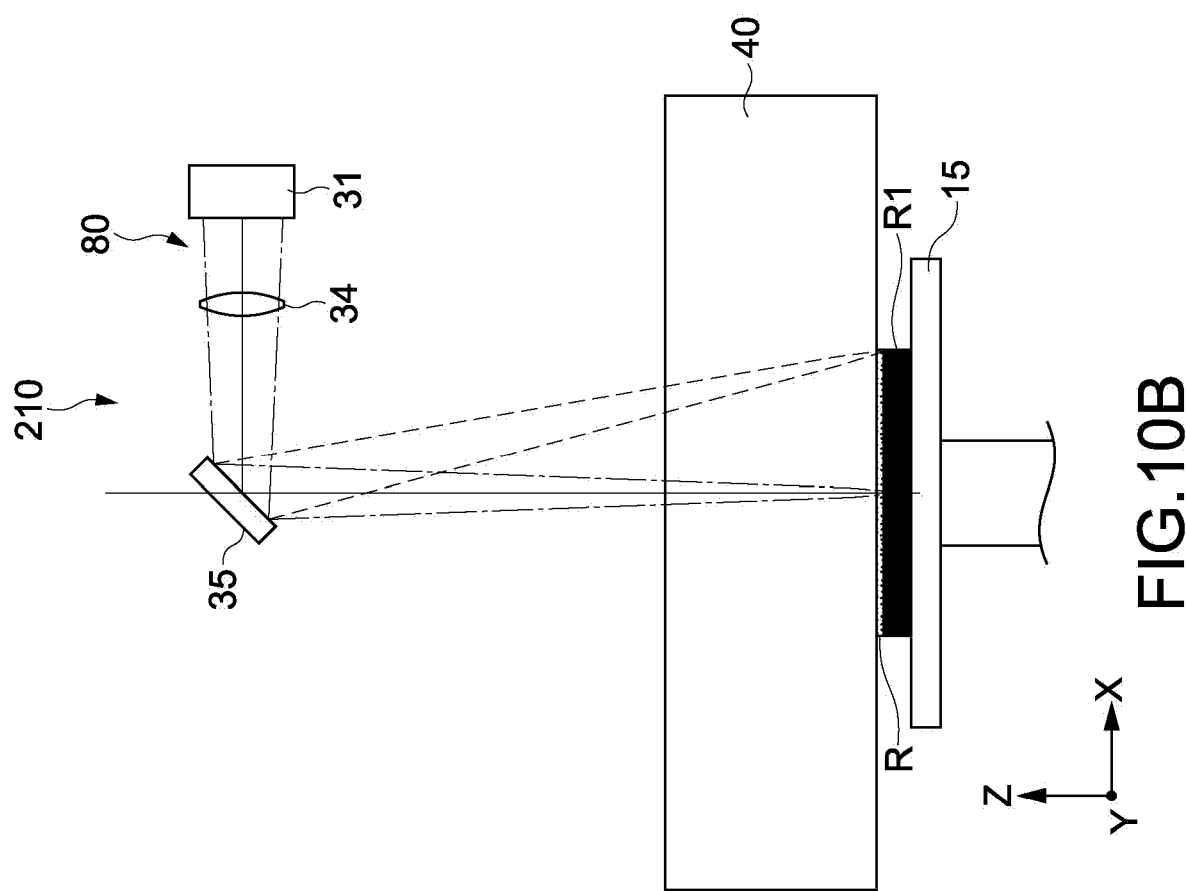
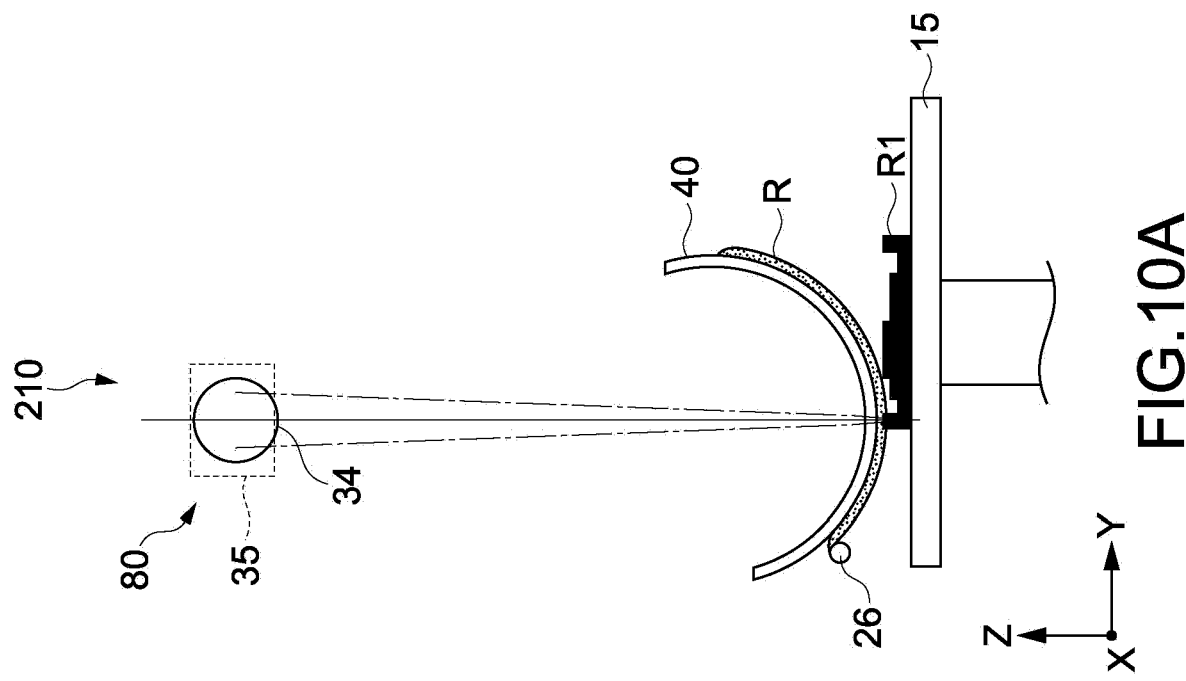

THREE-DIMENSIONAL MODELING APPARATUS, OBJECT, AND METHOD OF MANUFACTURING AN OBJECT

CROSS REFERENCE TO RELATED APPLICATIONS

The present application claims the benefit under 35 U.S.C. § 120 as a continuation application of U.S. patent application Ser. No. 13/208,557, filed Aug. 12, 2011, now U.S. Pat. No. 10,022,911, which claims priority under 35 U.S.C. § 119 to Japanese Patent Application No. JP 2010-0183640, filed in the Japan Patent Office On Aug. 19, 2010, the entire contents of each of which are incorporated herein by reference.

BACKGROUND

The present disclosure relates to a three-dimensional modeling apparatus that forms a three-dimensional object of a light-curing material, to an object to be formed by this apparatus, and to a method of manufacturing an object.

In the past, a modeling apparatus that forms a three-dimensional object has been known as an apparatus of rapid prototyping, which is widespread for commercial use. In general, the three-dimensional modeling apparatus forms an object on a layer-by-layer basis according to shape data for each predetermined thickness of a target to be modeled, that is, shape data for each layer.

As one of the main methods for the three-dimensional modeling apparatus, there is exemplified a stereo lithography in which light-curing resin is selectively irradiated with laser light so that desired parts of the resin are cured and drawn, to thereby form an object.

The stereo lithography includes, for example, a free surface method and a constrained-surface method. In the free surface method, the liquid surface of the light-curing resin is exposed to the air, and the laser light is focused on an interface between the air and the liquid surface so that the drawing is performed. In the free surface method, there is a problem that stacking accuracy of the resin (accuracy of thickness for each layer or surface state accuracy of resin for each layer) depends on surface accuracy of the liquid surface.

In view of this, in the constrained-surface method, the liquid surface of the light-curing resin is constrained for example by a flat glass surface, and through the glass, the laser light is focused on an interface between the liquid surface and the glass surface so that the drawing is performed.

Japanese Patent Application Laid-open No. 2009-137048 (hereinafter, referred to as Patent Document 1) discloses a stereo lithography apparatus employing the constrained-surface method. This stereo lithography apparatus includes a position constraining mechanism for preventing deflection of the glass and keeping the glass flat (for example, paragraphs [0077] and the like in the description, FIGS. 7 to 10 of Patent Document 1).

SUMMARY

In the constrained-surface method using the glass as in Patent Document 1, it is necessary to separate the cured resin from the glass after the modeling for each layer is completed. However, as an area to be modeled for each layer becomes larger, a power necessary for the separation becomes also larger. Therefore, in some cases, the object may be collapsed, or the object is separated from a seat (stage on which the object to be stacked).

Further, when the area to be modeled for each layer becomes larger as described above, the glass may be strained or pulled and deflected toward the resin due to a contraction force of the cured resin. Therefore, the flatness of the object for each layer is deteriorated. In this point, in the above-mentioned Patent Document 1, only the deflection of the glass is considered, and there is no countermeasure against the phenomenon that the glass is pulled to a direction opposite to the deflection direction.

In addition, as the viscosity of the light-curing resin becomes higher, a pressure that the resin applies to the seat surface or the glass surface becomes also higher. As a result, the glass surface is strained, and hence there is another problem that the thickness of the resin for each layer may not be controlled to have a predetermined thickness.

In view of the above-mentioned circumstances, there is a need for providing a three-dimensional modeling apparatus that is capable of neatly separating, from a constraining body that constrains a top surface of a material for forming an object, a cured layer of the material, and capable of enhancing the flatness of each layer or controlling the thickness of each layer with high accuracy. There is also a need for providing an object to be formed by this apparatus and a method of manufacturing an object.

According to an embodiment of the present disclosure, there is provided a three-dimensional modeling apparatus including a stage, a constraining body, a supply nozzle, an irradiation unit, and a movement mechanism.

The constraining body includes a surface including a linear region along a first direction, and is arranged so as to be opposed to the stage so that the linear region of the surface is the closest to the stage.

The supply nozzle is configured to supply a material curable by energy of an energy ray into a slit region being a region between the stage and the linear region.

The irradiation unit is configured to irradiate the material supplied by the supply nozzle into the slit region with the energy ray through the constraining body.

The movement mechanism is configured to move, in order to form a cured layer of the material for one layer by using the energy ray, the stage relative to the constraining body along a second direction different from the first direction. Further, the movement mechanism is configured to move, in order to stack the cured layers of the material, the constraining body and the stage relative to each other along a stacking direction.

The constraining body is arranged so that the linear region of the surface is the closest to the stage. Therefore, the material is irradiated with the energy ray and cured in the slit region or a region in vicinity thereof. That is, substantially in the slit region between the stage and the linear region, the material is cured. Downstream with respect to the constraining body, the both are moved relative to each other by the movement mechanism so that the surface of the constraining body is separated from the stage. With this, the cured layer of the material can be neatly separated from the constraining body.

Further, the slit region is formed of not a wide and flat region, but the linear region of the constraining body. Thus, as described above, the material is easy to be separated from the constraining body. Further, even if the contraction force is applied to the constraining body when the material is cured, the constraining body is prevented from being strained or deformed. With this, it is possible to enhance the flatness of each cured layer, and to control the thickness of each cured layer with high accuracy.

The linear region may be one-dimensional or two-dimensional. In the case where the linear region is two-dimensional, the linear region may be a flat surface or a curved surface. In the case where the linear region is actually the curved surface, no problem arises as long as the linear region includes such a surface that the top surface of the cured layer of the object can keep desired flat surface accuracy.

The constraining body may be formed to have a cylindrical shape. In this case, the surface including the linear region is an outer peripheral surface of the constraining body having the cylindrical shape. In this case, an axis direction of the cylindrical body corresponds substantially to the first direction. A part of the outer peripheral surface along that axis direction is the linear region. When the constraining body is formed to have a cylindrical shape, it is possible to provide the function of the constraining body with a simple shape. Further, when the constraining body is formed to have a cylindrical shape, under a state in which the material is being supplied into the slit region, when the movement mechanism moves the constraining body and the stage relative to each other, the constraining body is allowed to rotate and move about the axis due to the frictional force between the constraining body and the material.

The irradiation unit may be arranged in an inside of the constraining body having the cylindrical shape. With this, a merit when the constraining body is formed to have a cylindrical shape is enhanced. Further, as compared to a case where the irradiation unit is arranged outside of the cylindrical body, the three-dimensional modeling apparatus can be reduced in size.

The three-dimensional modeling apparatus may further include a plurality of guide rollers configured to support the constraining body so as to be rotatable. With this, a bearing becomes unnecessary.

The three-dimensional modeling apparatus may further include a drive portion configured to drive at least one of the plurality of guide rollers. With this, the drive portion is capable of rotating the constraining body. For example, when the supply nozzle supplies the material to the constraining body, the drive portion rotates the constraining body, and the material can be supplied into the slit region. Alternatively, in the case where extra material adheres to a part of the outer peripheral surface of the constraining body, the drive portion is capable of rotating the constraining body so that between the region of an unused surface to which extra material does not adhere and the stage, the slit region is formed.

The constraining body may be formed to have a shape of a plate including a surface being a curved surface. With this, it is possible to suppress the three-dimensional modeling apparatus from increasing the size, and at the same time, to increase the area of the linear region that can be considered as the flat surface.

The constraining body may be formed to have a part of a cylindrical body. In the case where the constraining body is formed to have a cylindrical shape, the irradiation unit is provided in the inside of the cylindrical body, and hence the length of the optical path of the energy ray is limited. However, as in the present disclosure, as long as the constraining body having a shape obtained by cutting out a cylindrical body is used, the limitation on the length of the optical path of the energy ray can be eliminated.

The movement mechanism may be configured to move the constraining body and the stage relative to each other along a direction including a vertical component. With this, the extra material can flow from the object downwardly due to the its own weight, to thereby reliably remove the extra material, and hence it is possible to realize a modeling with high accuracy.

The three-dimensional modeling apparatus may further include a cleaning nozzle configured to supply a cleaning material to the object formed on the stage. With this, from the cleaning nozzle toward the object, the cleaning material is discharged. Thus, even in the case where the object is cleaned by use of the cleaning material, the cleaning material flows down from the object, and the object, that is, the top surface of the cured layer can be made clean. With this, modeling accuracy can be enhanced.

The supply nozzle may include a plurality of supply nozzles, and the plurality of supply nozzles are configured to discharge different materials. In particular, in the case where the movement mechanism moves the constraining body or the stage along a direction including the vertical component, it becomes easy to remove the extra material, and hence it becomes easy to remove the extra material for each layer. In addition, it becomes easy to form an object having different kinds of materials for each layer.

The supply nozzle may include a nozzle of a slit coating type. With this, it is possible to control the thickness of the cured layer for one layer with high accuracy.

The supply nozzle may be configured to supply a material having a thixotropy as the material. With this, for example, an object having an overhang-like part can be formed.

The constraining body and the supply nozzle may include a plurality of constraining bodies and a plurality of supply nozzles with a set of each of the plurality of constraining bodies and each of the plurality of supply nozzles being as one pair. In this case, it is sufficient that the plurality of sets of the constraining bodies and the supply nozzles be arranged along the second direction along which the movement mechanism is configured to move the stage. With this, different kinds of materials can be used for forming one object.

The irradiation unit may radiate the energy ray so as to form a main body being a target to be modeled and an anchor pattern arranged in at least a part of a periphery of the main body of the object. With this, an edge portion of the main body of the object can be formed with high accuracy.

The irradiation unit may include a generation source configured to generate the energy ray, and a detector configured to detect intensity distribution of the energy ray generating from the generation source. In this case, the three-dimensional modeling apparatus may further include a control mechanism configured to control relative positions of the constraining body and the irradiation unit on a basis of the intensity distribution of the energy ray detected by the detector. With this, the position of the constraining body can be appropriately controlled, and hence the film thickness of the material can be controlled with high accuracy.

The three-dimensional modeling apparatus may further include a rotation mechanism configured to rotate the stage about an axis along the stacking direction. With this, a scan with the energy ray can be performed in a desired direction. As a result, for example, deformation (sink mark or warp) can be prevented from generating in the object when the object is removed from the stage.

The three-dimensional modeling apparatus may further include a protective film that is provided on the surface of the constraining body. For example, if the protective film is a removable film, by removing this film, the surface of the constraining body can be made to be clean. Alternatively, in the case where on the surface of the constraining body, the protective film is formed in advance, for example, it is possible to make the surface clean by simple cleaning or gas blow.

The three-dimensional modeling apparatus may further include an irradiation mechanism and a control portion. The irradiation mechanism is configured to radiate a plurality of energy beams as the energy ray. The control portion is configured to control the irradiation mechanism so that a period of time when all of the plurality of energy beams are being radiated includes a period of time when at least two energy beams of the plurality of energy beams are being radiated simultaneously. With this, a wide range on the material can be subjected to the exposure process at a time, and hence a period of time necessary for the modeling process can be reduced.

According to another embodiment of the present disclosure, there is provided an object to be formed by a three-dimensional modeling apparatus, the three-dimensional modeling apparatus including a stage, and a constraining body that includes a surface including a linear region along a first direction, and is arranged so as to be opposed to the stage so that the linear region of the surface is the closest to the stage. The object is formed in the following procedure.

A material curable by energy of an energy ray is supplied into a slit region being a region between the stage and the linear region.

The material supplied into the slit region is irradiated with the energy ray through the constraining body.

In order to form a cured layer of the material for one layer by using the energy ray, the stage is moved relative to the constraining body along a second direction different from the first direction.

In order to stack the cured layers of the material, the constraining body and the stage are moved relative to each other along a stacking direction.

According to still another embodiment of the present disclosure, there is provided a method of manufacturing an object by a three-dimensional modeling apparatus, the three-dimensional modeling apparatus including a stage, and a constraining body that includes a surface including a linear region along a first direction, and is arranged so as to be opposed to the stage so that the linear region of the surface is the closest to the stage.

A material curable by energy of an energy ray is supplied into a slit region being a region between the stage and the linear region.

The material supplied into the slit region is irradiated with the energy ray through the constraining body.

In order to form a cured layer of the material for one layer by using the energy ray, the stage is moved relative to the constraining body along a second direction different from the first direction.

In order to stack the cured layers of the material, the constraining body and the stage are moved relative to each other along a stacking direction.

As described above, according to the embodiments of the present disclosure, it is possible to neatly separate, from a constraining body that constrains a top surface of a material, a cured layer of the material (object), and to enhance the flatness of each layer or control the thickness of each layer with high accuracy.

These and other objects, features and advantages of the present disclosure will become more apparent in light of the following detailed description of best mode embodiments thereof, as illustrated in the accompanying drawings.

BRIEF DESCRIPTION OF DRAWINGS

FIGS. 10A and 10B are a side view and a front view showing main parts of a three-dimensional modeling apparatus according to a third embodiment of the present disclosure, respectively;

DETAILED DESCRIPTION OF EMBODIMENTS

Hereinafter, embodiments of the present disclosure will be described with reference to the drawings.

First Embodiment

Configuration of Three-Dimensional Modeling Apparatus

Figure 1:
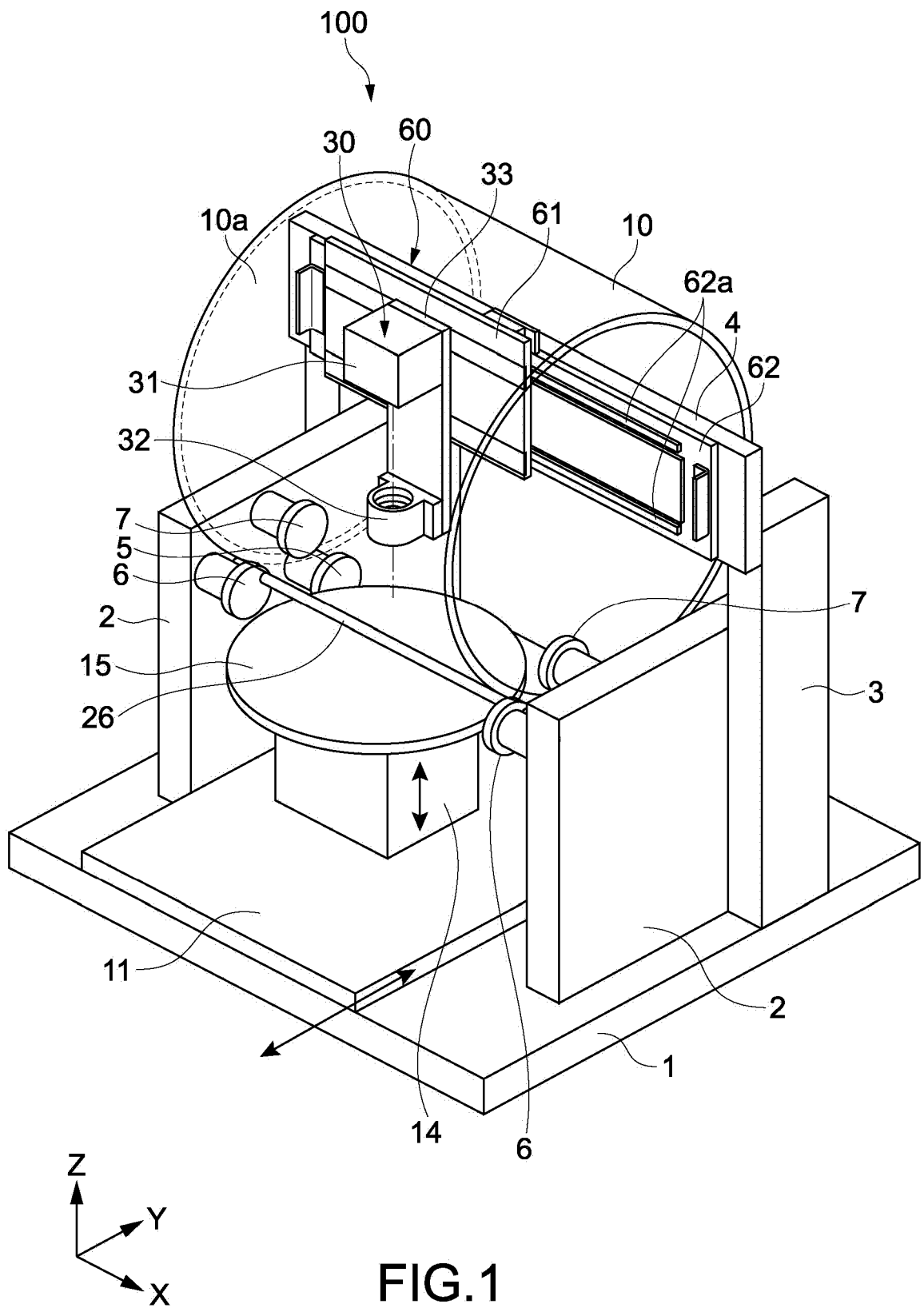
FIG. 1 is a perspective view showing a three-dimensional modeling apparatus according to a first embodiment of the present disclosure.
Figure 2:
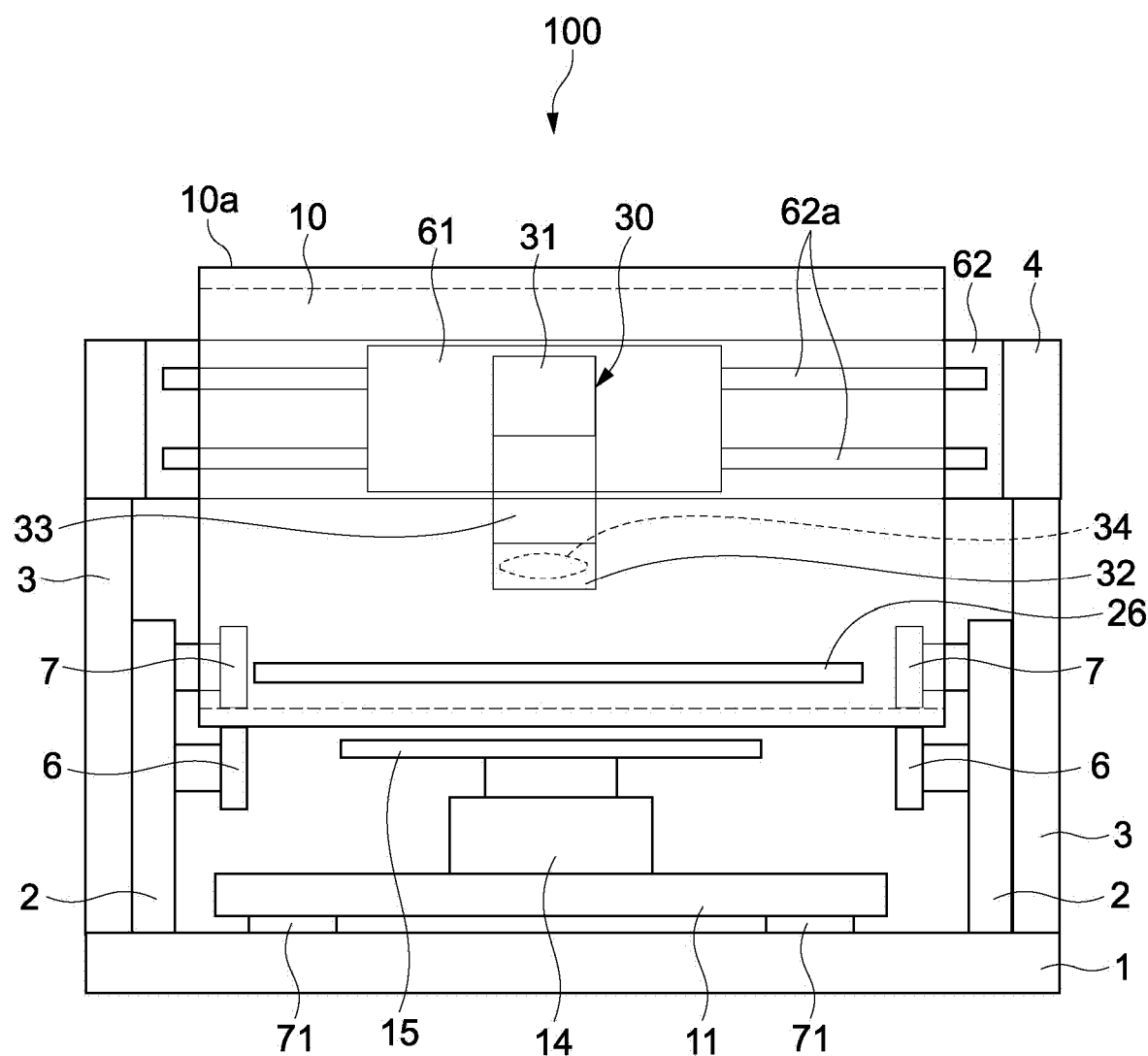
FIG. 2 is a front view of the three-dimensional modeling apparatus as viewed in the Y-axis direction.

FIG. 1 is a perspective view showing a three-dimensional modeling apparatus according to a first embodiment of the present disclosure. FIG. 2 is a front view of the three-dimensional modeling apparatus as viewed in the Y-axis direction.

A three-dimensional modeling apparatus 100 includes a base 1, two side walls 2, a modeling stage 15, and a drum 10. The side walls 2 are provided upright on a rear side on the base 1. The modeling stage 15 is arranged between the side walls 2. The drum 10 serves as a constraining body arranged so as to be opposed to the modeling stage 15.

Figure 3:
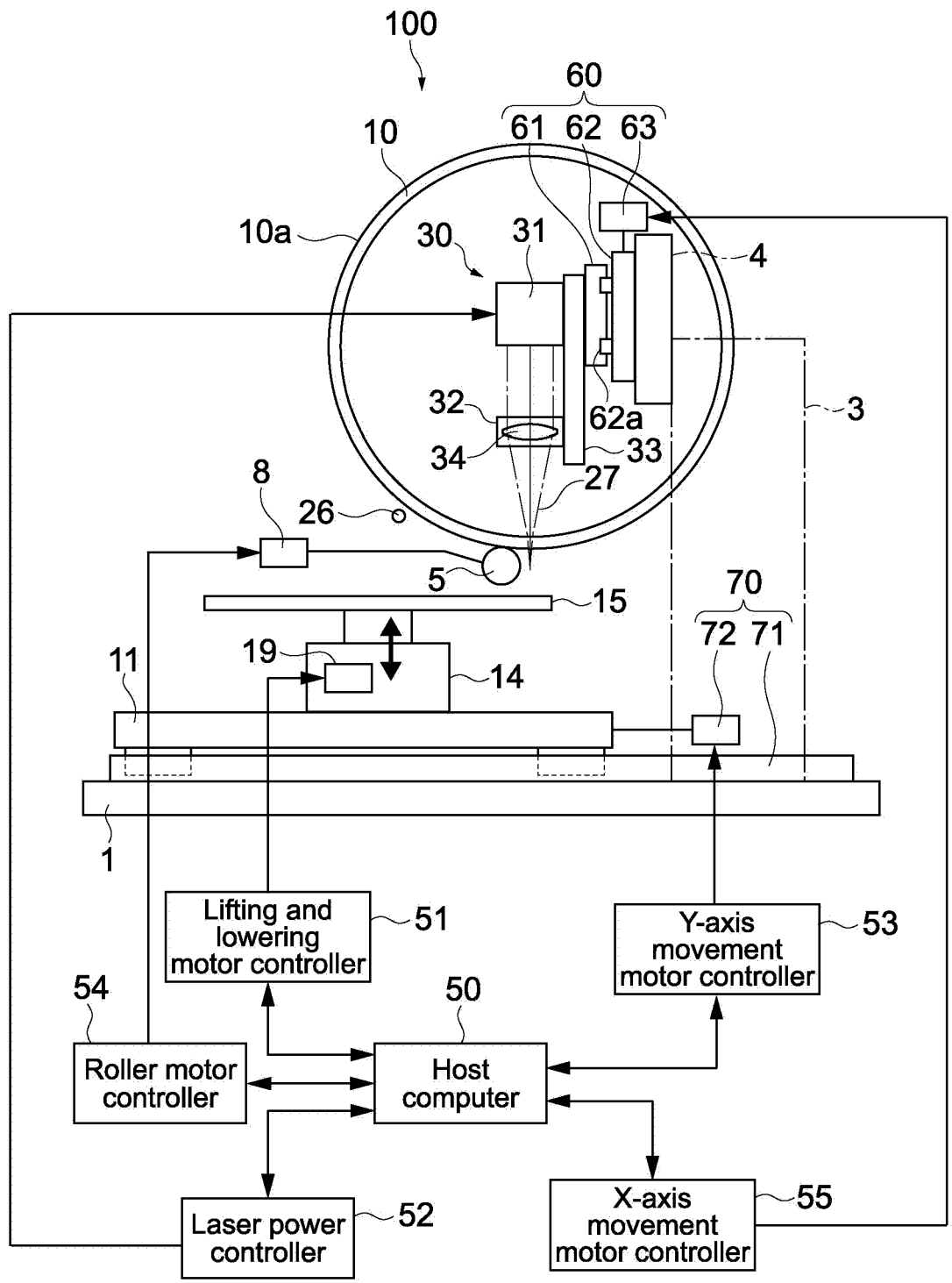
FIG. 3 is a schematic side view of the three-dimensional modeling apparatus and a block diagram of a configuration of a control system therefor.

FIG. 3 is a schematic side view showing the three-dimensional modeling apparatus 100, and a block diagram of a configuration of a control system therefor.

The drum 10 serving as the constraining body constrains the height of a top surface of a material supplied from a supply nozzle onto the modeling stage 15 as will be described later. The drum 10 is formed to have a substantially cylindrical shape, and is formed of, for example, glass. The drum 10 has a through-hole formed in the X-axis direction. In other words, the drum 10 is formed to have a tubular shape. As will be described later, a beam member 4 for supporting an irradiation unit 30 is provided so as to pass through the through-hole (the inside of the cylindrical body) of the drum 10.

In place of the glass, the drum 10 may be formed of acrylic resin or another transparent resin. The material of the drum 10 is not necessarily limited to those materials. Any material may be used for the drum 10 as long as it is a material transmissive to the energy ray radiated from the irradiation unit 30.

The inner diameter of the drum 10 ranges approximately from 30 to 70 mm, and the wall thickness thereof is about 2 mm. However, such a range can be appropriately changed.

The modeling stage 15 is supported by a lifting and lowering mechanism 14 so as to be capable of lifting and lowering. The modeling stage 15 and the lifting and lowering mechanism 14 are placed on a movement base 11. The movement base 11 is set to be movable by means of a Y-axis movement mechanism 70 (see FIG. 3). The Y-axis movement mechanism 70 includes a Y-axis movement motor 72 and guide rails 71. The guide rails 71 are set on the base 1 and guide the movement of the movement base 11.

As shown in FIGS. 1 and 2, in the inside of the side walls 2, there are provided a plurality of guide rollers that support the drum 10 so as to be rotatable about an axis along the X-axis direction. For example, for one of the side walls 2, three guide rollers 5, 6, and 7 are provided. The guide roller 7 holds the inner peripheral surface of the drum 10 downwardly. The two guide rollers 5 and 6 support the outer peripheral surface (surface) 10a of the drum 10 from below. That is, the three guide rollers 5, 6, and 7 sandwich the wall of the drum 10 so that the drum 10 is supported. As described above, the guide rollers 5, 6, and 7 support the drum 10, and hence a bearing is unnecessary.

The guide rollers 5, 6, and 7 support the drum 10 at a predetermined height position in the Z-axis direction so that a slit region S (see FIG. 6), which will be described later, is formed between the stage and the outer peripheral surface 10a of the drum 10. That is, in such a manner that the top surface of the modeling stage 15 is opposed to a linear region A1 along the X-axis direction (first direction), the slit region S is formed, the linear region A1 being the lowest part of the outer peripheral surface 10a of the drum 10 (part closest to the stage, of the drum 10). The linear region A1 forms a part of the outer peripheral surface 10a of the drum 10, and is a region that can be considered as a substantially flat surface.

The width of the linear region A1 in the Y-axis direction (second direction) ranges from 0.1 to 1 mm. Further, the spot diameter of the laser light to be radiated from the irradiation unit 30, which will be described later, ranges from 1 to 100 μm. However, the width of the linear region A1 and the spot diameter can be appropriately changed depending on the size of the drum, the size of the object, the modeling accuracy, and the like. Therefore, the width of the linear region A1 and the spot diameter can depart from the above-mentioned ranges.

As shown in FIG. 3, of the three guide rollers 5, 6, and 7, for example, one guide roller 5 is set to be driven by a roller motor 8. With this, the drum 10 is rotated by the guide roller. It should be noted that an embodiment in which two or more of the guide rollers 5, 6, and 7 is set to be driven by a motor may be employed.

It should be noted that the arrangement of those three guide rollers 5, 6, and 7 is not limited to that in the embodiment as shown in FIG. 1, and can be appropriately changed.

Between the side walls 2, there is provided a supply nozzle 26 that has a shape long along the X-axis and supplies light-curing material R to the drum 10. The supply nozzle 26 is arranged, for example, below the drum 10, at a position spaced from the linear region A1 being the lowest part of the drum 10. As the supply nozzle 26, a nozzle of a type that has, along its longitudinal direction, a plurality of holes (not shown) for discharging the light-curing material R. Alternatively, as the supply nozzle 26, a nozzle of a slit coating type having slit provided along its longitudinal direction may be provided. The plurality of holes or the slit are/is open to a side on which the drum 10 is arranged.

It should be noted that, to the supply nozzle 26, for example, a pump, a pipe, an on-off valve, and the like (not shown) for introducing into the supply nozzle 26 the light-curing material R are connected.

As shown in FIG. 1, the three-dimensional modeling apparatus 100 includes the lifting and lowering mechanism (part of the movement mechanism) 14 that supports the modeling stage 15 and lifts and lowers the modeling stage 15 with respect to the movement base 11. The lifting and lowering mechanism 14 uses a lifting and lowering motor 19 to lift and lower the modeling stage 15, to thereby control a distance between the modeling stage 15 and the linear region A1 of the drum 10. The most upper position of the modeling stage 15 lifted by the lifting and lowering mechanism 14 is set to substantially a position at which the linear region A1 of the drum 10 is arranged. Although the modeling stage 15 has a circular shape in a horizontal plane (in the X-Y plane), the shape is not limited to the circular shape. The shape may be a rectangular shape or another shape. As the light-curing material R, typically, an ultraviolet-curing resin is used.

As shown in FIG. 1, the three-dimensional modeling apparatus 100 includes the irradiation unit 30 that irradiates the light-curing material R supplied from the supply nozzle 26 with the laser light as the energy ray. On the rear side of the three-dimensional modeling apparatus 100, two supporting posts 3 are provided upright on the base 1. Between those two supporting posts 3, the beam member 4 is provided. As described above, the beam member 4 is provided to pass through the inside of the drum 10. The irradiation unit 30 is arranged in the inside of the drum 10, and is movable in the X-axis by an X-axis movement mechanism 60 provided on the beam member 4. The X-axis movement mechanism 60 includes an X-axis movement motor 63 (see FIG. 3), a rail plate 62 including guide rails 62a fixed on the beam member 4, and a movable plate 61 attached to the rail plate 62 so as to be movable. The X-axis movement mechanism 60 functions as a scan mechanism for a scan with the laser light in the X-axis direction.

The irradiation unit 30 is fixed on the movable plate 61, and includes a laser light source 31, an objective lens holder 32 arranged immediately under the laser light source 31, an objective lens 34 (see FIGS. 2, 3, and the like) held by the objective lens holder 32, and a fixing plate 33. The fixing plate 33 supports the laser light source 31 and the objective lens holder 32, and fixes them with respect to the movable plate 61.

The irradiation unit 30 limits the spot diameter of the laser beam emitted from the laser light source 31 through the objective lens 34, and focuses through the wall of the drum 10 on the light-curing material R located in the slit region S or on the light-curing material R located in the slit region S and in vicinity of the slit region S. That is, typically, the objective lens 34 is arranged at such a position on the optical axis that the focus point of the laser light corresponds to at least the light-curing material R in the slit region S.

The lifting and lowering mechanism 14, the Y-axis movement mechanism 70, and the X-axis movement mechanism 60, which are shown in FIG. 3, can be realized, for example, by a ball and screw drive mechanism, a rack and pinion drive mechanism, a belt driving mechanism, or a fluid pressure cylindrical body drive mechanism.

Further, the three-dimensional modeling apparatus 100 includes a lifting and lowering motor controller 51, a roller motor controller 54, an X-axis movement motor controller 55, and a Y-axis movement motor controller 53. The lifting and lowering motor controller 51 controls the driving of the lifting and lowering motor. The roller motor controller 54 controls the driving of the roller motor 8. The Y-axis movement motor controller 53 controls the driving of the Y-axis movement motor 72. The X-axis movement motor controller 55 controls the driving of the X-axis movement motor 63. Further, the three-dimensional modeling apparatus 100 includes a laser power controller 52 that controls the power of the laser light to be emitted from the laser light source 31. The respective operations of those controllers are generally controlled by a host computer 50. Although not shown in the drawing, the three-dimensional modeling apparatus 100 further includes a controller for driving the pump and the on-off valve, which are connected to the supply nozzle 26.

The host computer and the respective controllers include a CPU (Central Processing Unit), a RAM (Random Access Memory), a ROM (Read Only Memory), and the like. In place of the CPU, a DSP (Digital Signal Processor), a PLD (Programmable Logic Device) (for example, FPGA (Field Programmable Gate Array)), ASIC (Application Specific Integrated Circuit), or the like may be used. Although it is typical that the controllers are connected to each other in a wired manner, at least one of those controllers may be wirelessly connected to a control system of the three-dimensional modeling apparatus 100. The controllers may be all configured in hardware.

Figure 4A:
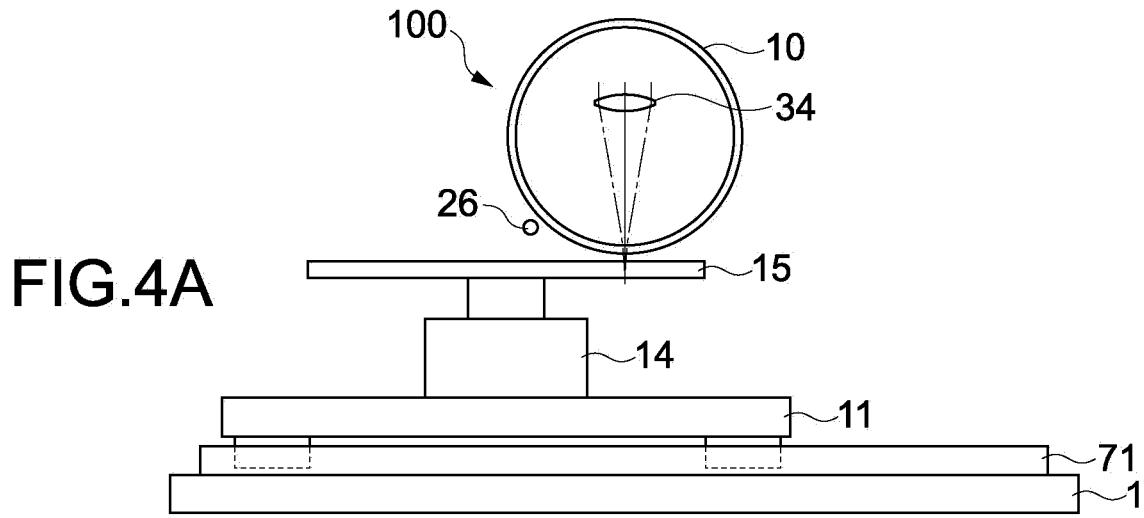
FIGS. 4A to 4C are views showing an operation of the three-dimensional modeling apparatus step by step.
Figure 4B:
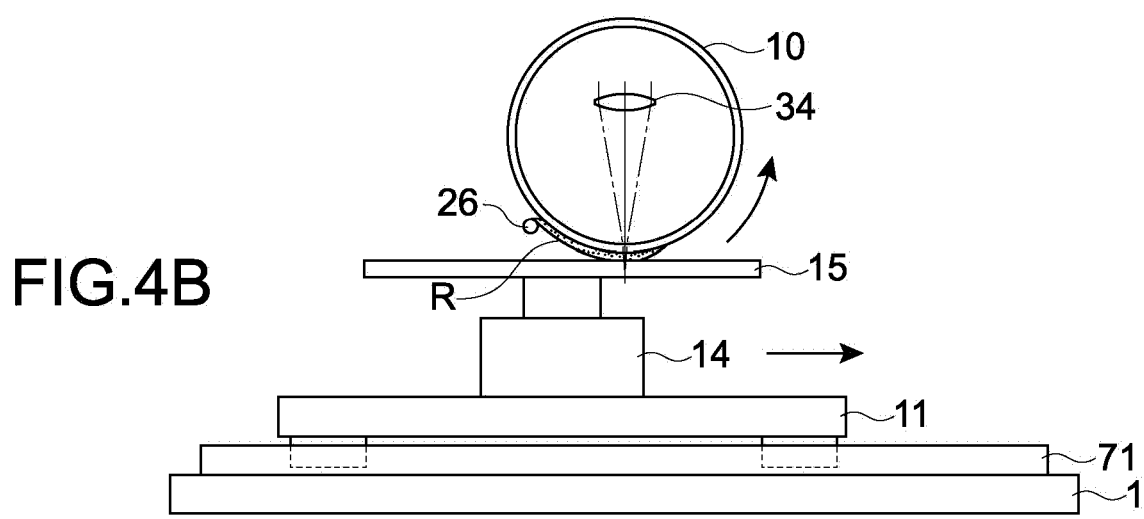
Figure 4C:
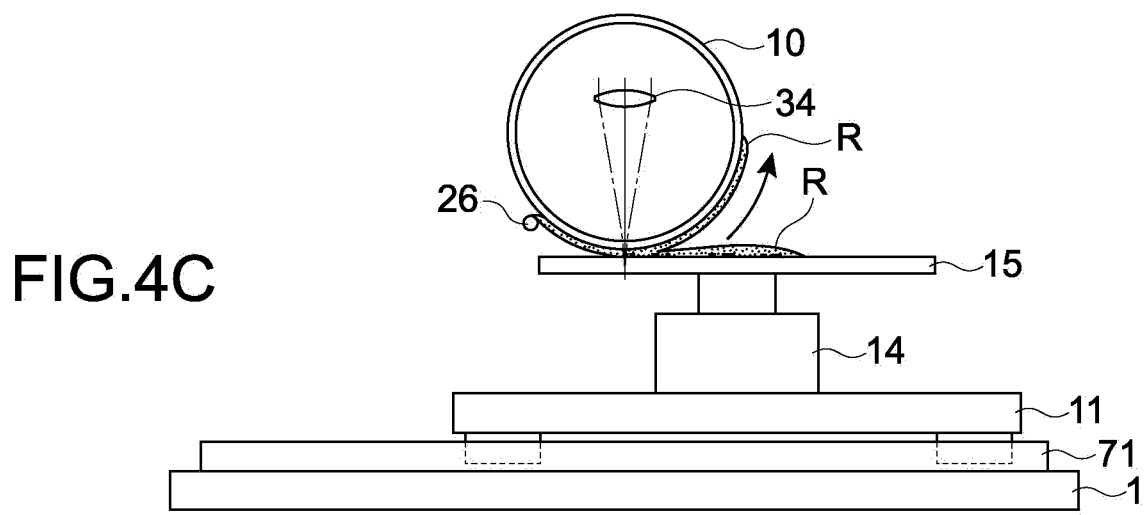

(Operation of three-dimensional modeling apparatus)
Next, an operation of the three-dimensional modeling apparatus 100 configured in the above-mentioned manner will be described. FIGS. 4A to 4C are views showing the operation step by step.

FIG. 4A shows a state in which the three-dimensional modeling apparatus 100 is stopped and the movement base 11 is in an initial position. Before actually carrying out the modeling, the thickness for one layer of the cured layer being the light-curing material R is set through the host computer. Then, for example, by driving the lifting and lowering mechanism 14 under the control of the lifting and lowering motor controller 51, the height position of the modeling stage 15 when the modeling stage 15 is brought into contact with the linear region A1 being the lowest part of the drum 10 is set as the origin of the Z-axis direction.

It should be noted that regarding a position of the modeling stage 15 in the Y-axis direction at the time of setting the origin, it can be appropriately set.

When the origin is set, the modeling stage 15 is then lowered for the predetermined thickness of one layer of the light-curing material R.

After the modeling stage 15 is lowered, the modeling stage 15 is moved by the Y-axis movement mechanism 70 to a modeling start position being a predetermined position as shown in FIG. 4B. The modeling start position means such a position of the modeling stage 15 in a direction along the Y-axis that the slit region S can be formed between the modeling stage 15 and the linear region A1 of the drum 10. As long as it is such a position of the modeling stage 15 that the slit region S can be formed, the setting of the modeling start position can be appropriately changed depending on the size in the Y-axis direction of the object to be formed.

When the modeling stage 15 is arranged at the modeling start position, the supply nozzle 26 then supplies the light-curing material R toward the lower surface of the drum 10. As already mentioned above, as the light-curing material R, for example, ultraviolet-curing resin is used. Hereinafter, the light-curing material R is referred to as resin liquid R for the sake of convenience.

Figure 6:
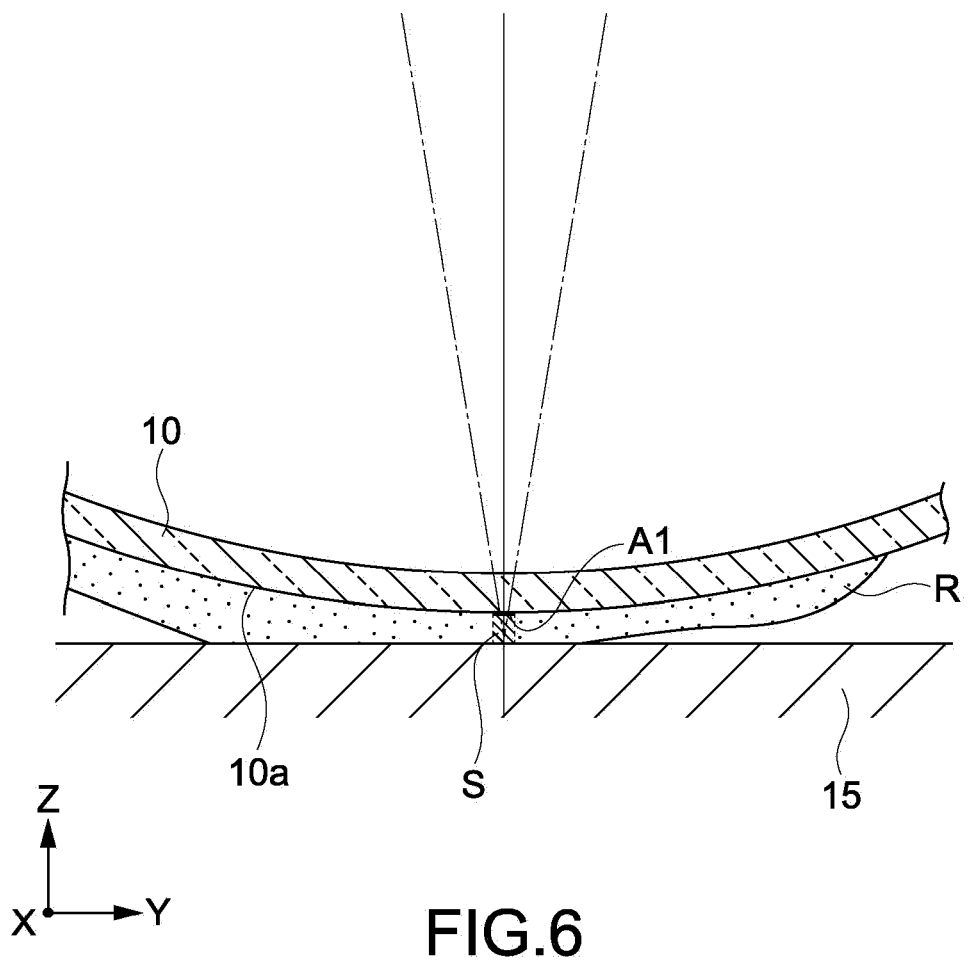
FIG. 6 is a view showing a slit region and its periphery in an enlarged state.

When the resin liquid R is transferred onto the drum 10 as described above, under the control of the roller motor controller 54, the roller motor drives the guide rollers 5. With this, the drum 10 is rotated until a part of the drum 10, to which the resin liquid R adheres, is arranged in the lowest part of the drum 10. Then, the rotation of the drum 10 is stopped. The slit region S and its periphery at this time are shown in FIG. 6 in an enlarged state. Under such a state, the irradiation of the resin liquid R with the laser light, that is, exposure is started.

With some kinds of resin liquids R, the resin liquid R flows down the drum 10 due to its own weight so that a space including the slit region between the lower surface of the drum 10 and the top surface of the modeling stage 15 is filled with the resin liquid R. If the resin liquid R flows down the outer peripheral surface 10a of the drum 10 due to its own weight, the rotation of the drum 10 is unnecessary.

Then, the irradiation unit 30 radiates the laser light. The laser light generating from the laser light source 31 passes through the objective lens 34, and is input through the drum 10 into the resin liquid R in the slit region S. The irradiation unit 30 is controlled by the X-axis movement motor controller 55 to move in a direction along the X-axis. At the same time, the irradiation unit 30 exposes the resin liquid R to the light selectively on the basis of data for one row in the X-axis direction of one layer of the target to be modeled, under the control of the laser power controller 52.

Specifically, the laser power controller 52 generates a modulation signal for the laser power on the basis of the data for one row, and transmits the modulation signal to the laser light source 31. In this manner, the resin liquid R for one row in the X-axis direction of one layer is selectively exposed to the light and cured. At least the resin liquid R in the slit region S is exposed to the light. During the exposure by the irradiation of the laser light, the drum 10 is stopped.

As the laser light, one that has a wavelength region of the ultraviolet is used. Although the thickness for one layer of the object ranges from 1μ to 100 μm, the thickness is not limited to such a range and can be appropriately set.

When the exposure for one row along the X-axis direction of the resin liquid R is completed, and the irradiation operation of the laser light is stopped. Then, the Y-axis movement mechanism 70 moves the modeling stage 15 in the direction along the Y-axis to the rear side (right side in FIG. 4B) by a predetermined pitch. After that, a selective exposure for the subsequent one row of the first layer (one row adjacent to the first row) is performed in the above-mentioned manner.

When the three-dimensional modeling apparatus 100 repeats a scanning irradiation of the laser light along the X-axis direction and stepwise feeding of the modeling stage 15 along the Y-axis direction as described above, as shown in FIG. 4C, the selective cured layer pieces of the resin liquid R for one layer, that is, the object for one layer is formed. As described above, similarly to a so-called luster scan, the exposure process for one layer is performed. Although the pitch of intermittent movement of the modeling stage in the direction along the Y-axis as described above depends on the spot diameter of the laser beam, that is, the resolution when the object is formed, the pitch of intermittent movement can be appropriately set.

Figure 7:
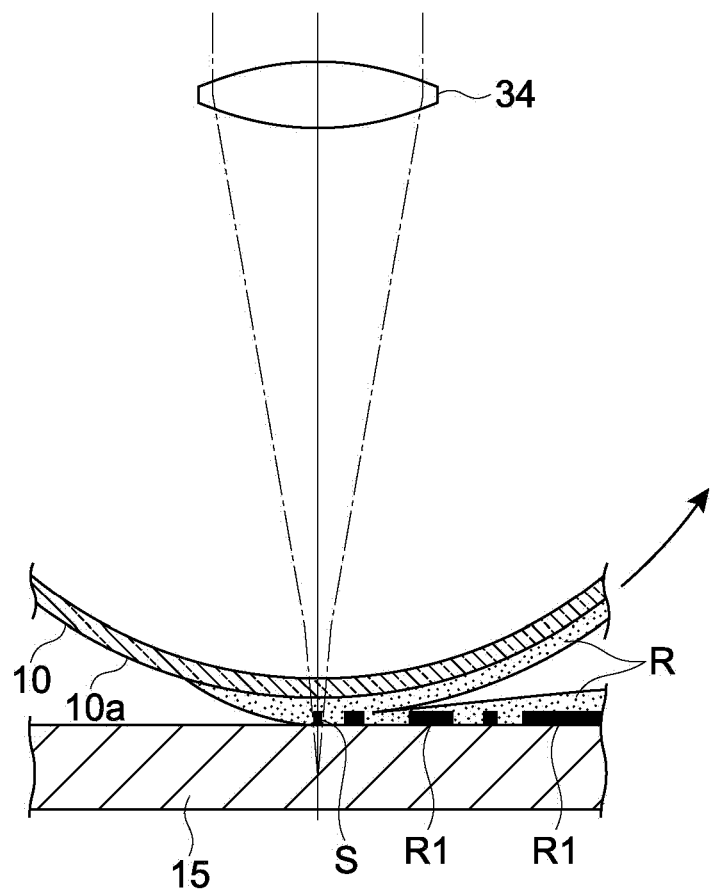
FIG. 7 is a view showing resin liquid and a cured layer on a modeling stage, which are shown in FIG. 4C, in an enlarged state.

FIG. 7 is a view showing the resin liquid R and the cured layer on the modeling stage 15, which are shown in FIG. 4C, in an enlarged state. In FIG. 7, the cured layer pieces R1 for one layer are shown in black. As shown in FIG. 7, on the right side being downstream with respect to the slit region S, uncured resin liquid R adheres to the drum 10. Further, also onto the formed cured layer pieces R1 for one layer, uncured resin liquid R adheres. However, no problem arises, and the reason will be described later.

When the exposure for one row along the X-axis direction is completed, and the modeling stage 15 (and the movement base 11) is moved by the Y-axis movement mechanism 70 in the direction along the Y-axis, due to the frictional force between the drum 10 and the modeling stage 15, the drum 10 is dragged and rotated in a counterclockwise direction in FIGS. 3 and 7. Alternatively, at this time, the guide rollers 5 may be driven by the roller motor 8, to thereby rotate the drum 10.

At the time when the exposure for one row of the resin liquid R is completed and the modeling stage 15 is moved by predetermined one pitch, downstream with respect to the slit region S (on the right side with respect to the slit region S in FIG. 6, for example), the modeling stage 15 is moved so that the drum 10 is separated from the modeling stage 15 in the Z-axis direction. In this manner, the just formed cured layer pieces R1 (cured layer pieces adhering to the outer peripheral surface 10a of the drum 10) can be neatly separated from the drum 10.

Further, in the traditional constrained-surface method, the flatness of the object has been deteriorated due to the strain of the film or the glass surface, which has been one of the problems. In contrast, in this embodiment, the shape of the outer peripheral surface 10a of the drum 10 is curved surface shape (cylindrical surface shape), and the liquid surface is constrained by the linear region A1. Thus, even if the contraction force when the resin liquid R is cured is applied to the drum 10, the deformation and the strain of the drum 10 are not easily generated. Further, it is possible to prevent the deformation of the drum 10 due to the viscosity of the resin liquid R before the exposure. With this, it is possible to enhance the flatness of the cured layer R1, and further to control its thickness with high accuracy.

From experiment by the inventor, it has been confirmed that, comparing the surface being the curved surface (for example, the outer peripheral surface 10a of the drum 10) and the surface being the flat surface (for example, the top surface of the modeling stage 15) to each other, the adhesion force of the cured resin layer to the surface being the curved surface is smaller than that of the flat surface, and the cured resin layer remains on the flat surface rather than the curved surface. In this experiment, in the case where the curved surface and the flat surface were made of the same material, such a result was obtained.

Furthermore, once a cured layer for one layer is formed on the modeling stage 15, the resin material for the subsequent cured layer exhibits a larger adhesion force to the preceding layer made of the same material rather than to the outer peripheral surface 10a of the drum 10. From the experiment, it has been confirmed that, even when the radius of curvature of the constraining body made of glass is 1 m, the cured layer can be sufficiently neatly separated.

Thus, in this embodiment, the cured layer can be reliably separated from the drum.

When the exposure to the resin liquid R for one layer is completed, the modeling stage 15 is then lowered by the thickness for one layer of the cured layer R1. Then, the movement base 11 and the modeling stage 15 are moved from the position shown in FIG. 4C back to the modeling start position shown in FIG. 4B. In this case, while the modeling stage 15 is being lowered, the movement base 11 and the modeling stage 15 may be moved back to the modeling start position.

Further, when the exposure of the resin liquid R for one layer is completed, and the modeling stage 15 is lowered, the guide rollers 5 are driven so that the drum 10 is rotated by a predetermined angle in the counterclockwise direction in FIGS. 3, 7, and the like. As a result, an used outer peripheral surface 10a, to which the resin liquid R does not adhere, of the drum 10 becomes opposed to the modeling stage 15. The extra resin liquid R adhering to the outer peripheral surface 10a of the drum 10 is regularly removed by a cleaning apparatus (not shown).

Then, in the modeling process (exposure process) for the second layer, the uncured resin liquid R, which remains on the cured layer R1 being the first layer, is exposed to the light by the same operation as that for the first layer, to thereby form a cured layer R1 being the second layer. While layers of the object are being stacked in the Z-axis direction in this manner, the resin liquid R is regularly supplied to the drum 10.

However, it is needless to say that the resin liquid R may be supplied for each modeling process for one layer or with a shorter period or constantly.

In the above description, after the exposure process for one layer is completed, the drum 10 is rotated by a predetermined angle. However, in the case where the shape accuracy is not desired by the user, even if the extra resin liquid R adheres to the outer peripheral surface 10a of the drum 10 after the exposure of the resin liquid R for one layer is completed, the modeling may be performed for a plurality of layers without rotating the drum 10 by a predetermined angle.

Figure 5A:
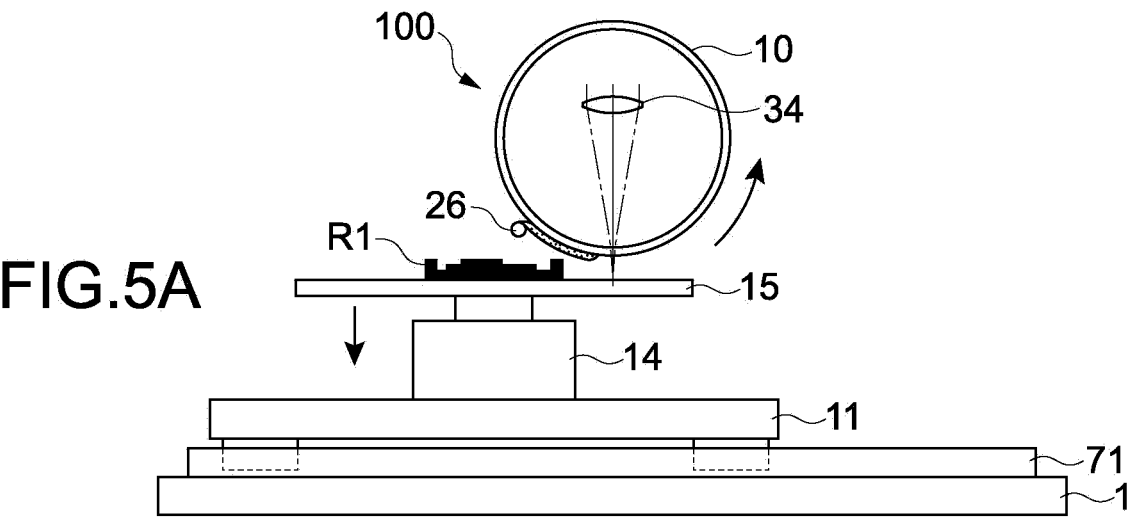
FIGS. 5A to 5C are views showing the operation of the three-dimensional modeling apparatus step by step.
Figure 5B:
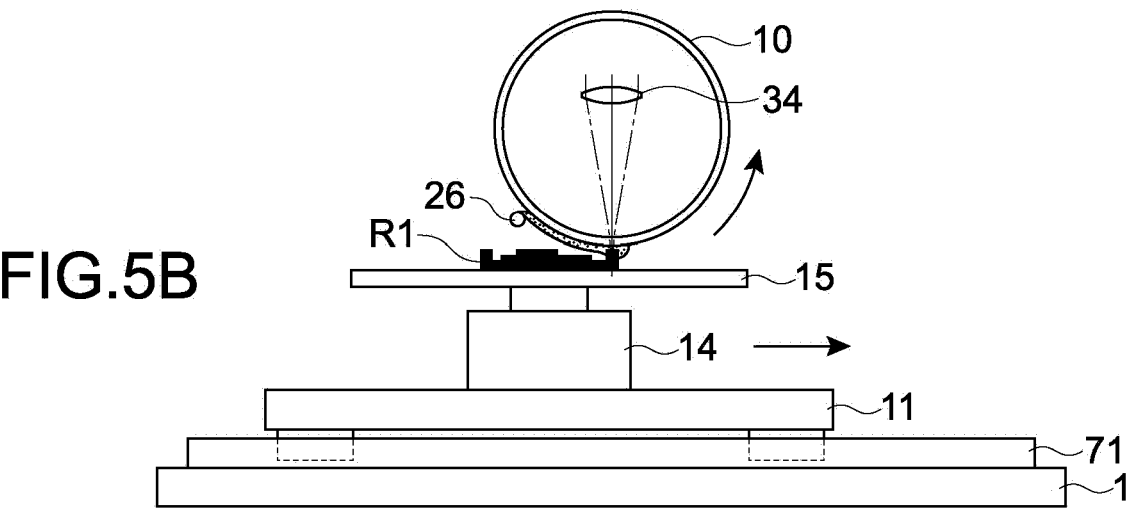
Figure 5C:
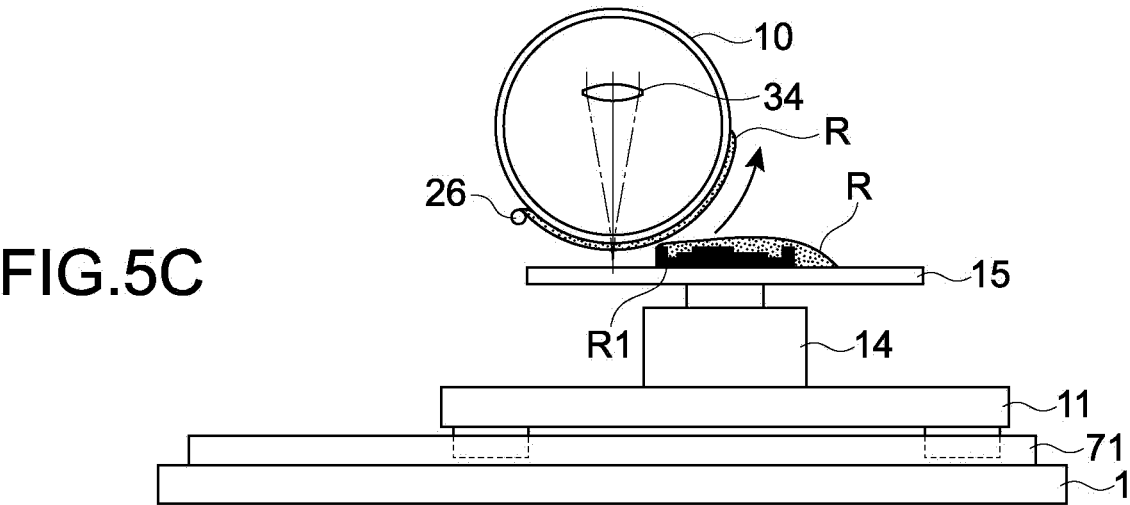

Under the state in which the object has already been formed of the layers stacked by an appropriate thickness as described above, an additional cured layer R1 for one layer is, as shown in FIGS. 5A to 5C, formed on that object by the same operation as the operation shown in FIG. 4.

Figure 8:
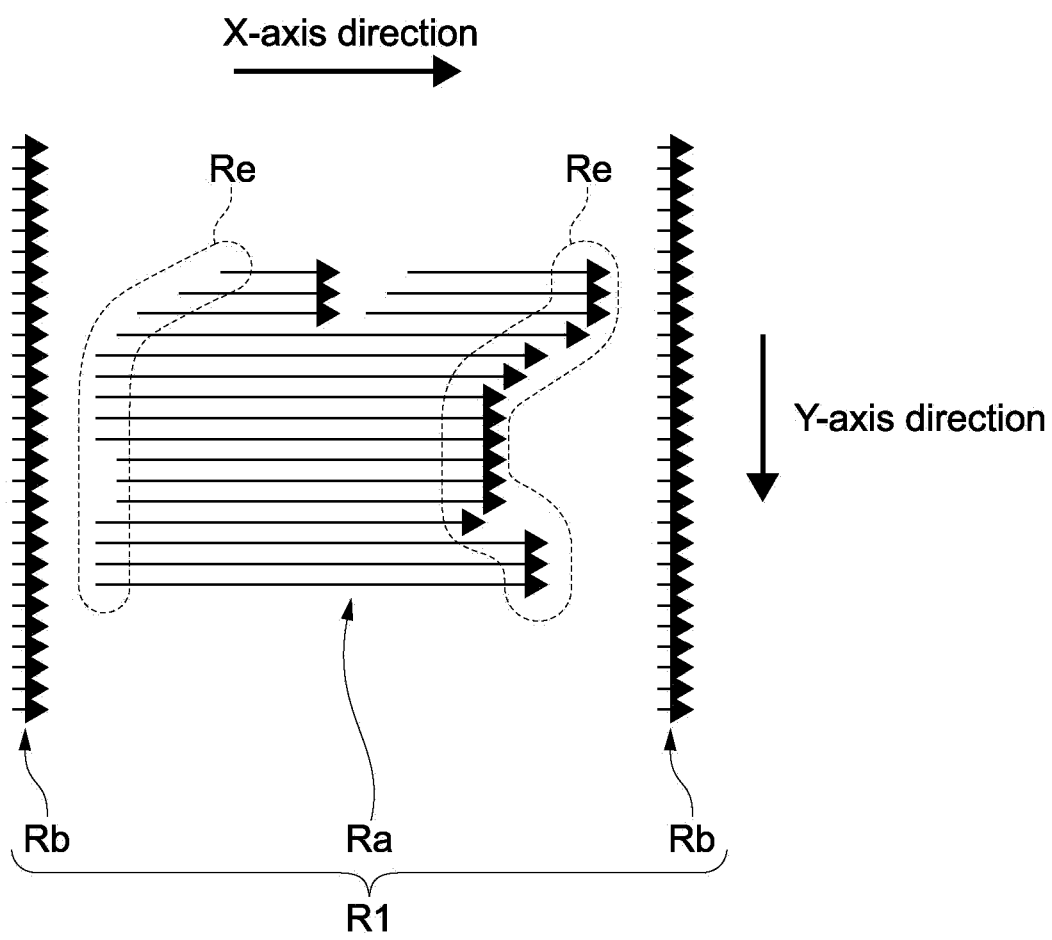
FIG. 8 is a view showing a pattern in an exposure process for one layer as viewed in the Z-axis direction.

The three-dimensional modeling apparatus 100 may form an anchor pattern as follows. FIG. 8 is a view showing a pattern of the exposure process for one layer as viewed in the Z-axis direction. In this example, at the start point and the termination point along the X-axis direction of a scan by the irradiation unit 30, the laser light is radiated to thereby form anchor patterns Rb as parts of the object. That is, the object (cured layer R1) includes a main body Ra and the anchor patterns Rb formed around the main body Ra.

As described above, the anchor patterns Rb are formed, and hence it is possible to suppress adverse effects on the modeling accuracy due to a change of the scan speed in start-up and shut-down of the scan by the irradiation unit 30. With this, the exposure process for edge portions Re in the X-axis direction of the main body Ra formed in the inside of the anchor patterns Rb can be uniformed in the Y-axis direction. With this, the edge portions Re of the main body Ra can be formed with high accuracy.

Each of the anchor patterns Rb in the example shown in FIG. 8 is formed to have a linear shape along the Y-axis direction, for example. However, the shape of the anchor pattern Rb along the Y-axis direction may not necessarily be the linear shape. The shape of the anchor patterns Rb may be bracket-shape (for example, < >). Alternatively, the shape of the anchor pattern Rb may be a zigzag shape, or a shape corresponding to the shape of the object. The length of the anchor pattern Rb in the X-axis direction can be appropriately set.

As described above, in this embodiment, the thickness for each layer of the object can be correctly kept constant. With this, uniformity on the flat surface of the cured layer R1 for one layer can be improved.

In this embodiment, as described above, the modeling stage 15 is moved so that the drum 10 is separated from the modeling stage 15 in the Z-axis direction, and hence the cured layer R1 made of resin can be neatly separated from the drum 10.

In this embodiment, the linear region A1 constrains the liquid surface of the resin liquid R, and hence even if the resin material having high viscosity is used, the object having a correct layer thickness can be formed. Thus, the range of choices for the material to be used can be expanded.

In the traditional constrained-surface method, it has taken a long time to separate the object from the film or the glass surface. However, in this embodiment, during the exposure process, at the time of the stepwise feeding of the modeling stage 15 in the direction along the Y-axis, the object is separated from the drum 10. That is, the exposure process for one layer and the separation process overlaps in time, and hence a period of time for forming the object can be shorten.

In this embodiment, on the linear region A1 of the drum 10, the separation of the drum 10 being the constraining body from the modeling stage 15 occurs little by little in an intermittent manner (for each stepwise feeding along the Y-axis direction). Thus, the separation force is small, and hence it is possible to prevent the cured layer R1 from being damaged. That is, the cured layer R1 is easily separated from the constraining body. Further, the separation force is small as described above, and hence it is also possible to prevent the cured layer R1 from being separated from the modeling stage 15.

In this embodiment, the lowest part of the outer peripheral surface 10a of the drum 10 is the linear region A1, and, between the region A1 and the modeling stage 15, the slit region S to be the exposed region is formed. That means that, when the drum 10 being the constraining body is formed to have a cylindrical shape, the function as the constraining body can be provided with a simple shape.

In this embodiment, the irradiation unit 30 is arranged within the drum 10. This increases a merit when the drum 10 is formed to have a cylindrical shape. Further, as compared to a case of arranging the irradiation unit 30 in the outside of the drum 10, the three-dimensional modeling apparatus 100 can be reduced in size.

Second Embodiment

Figure 9:
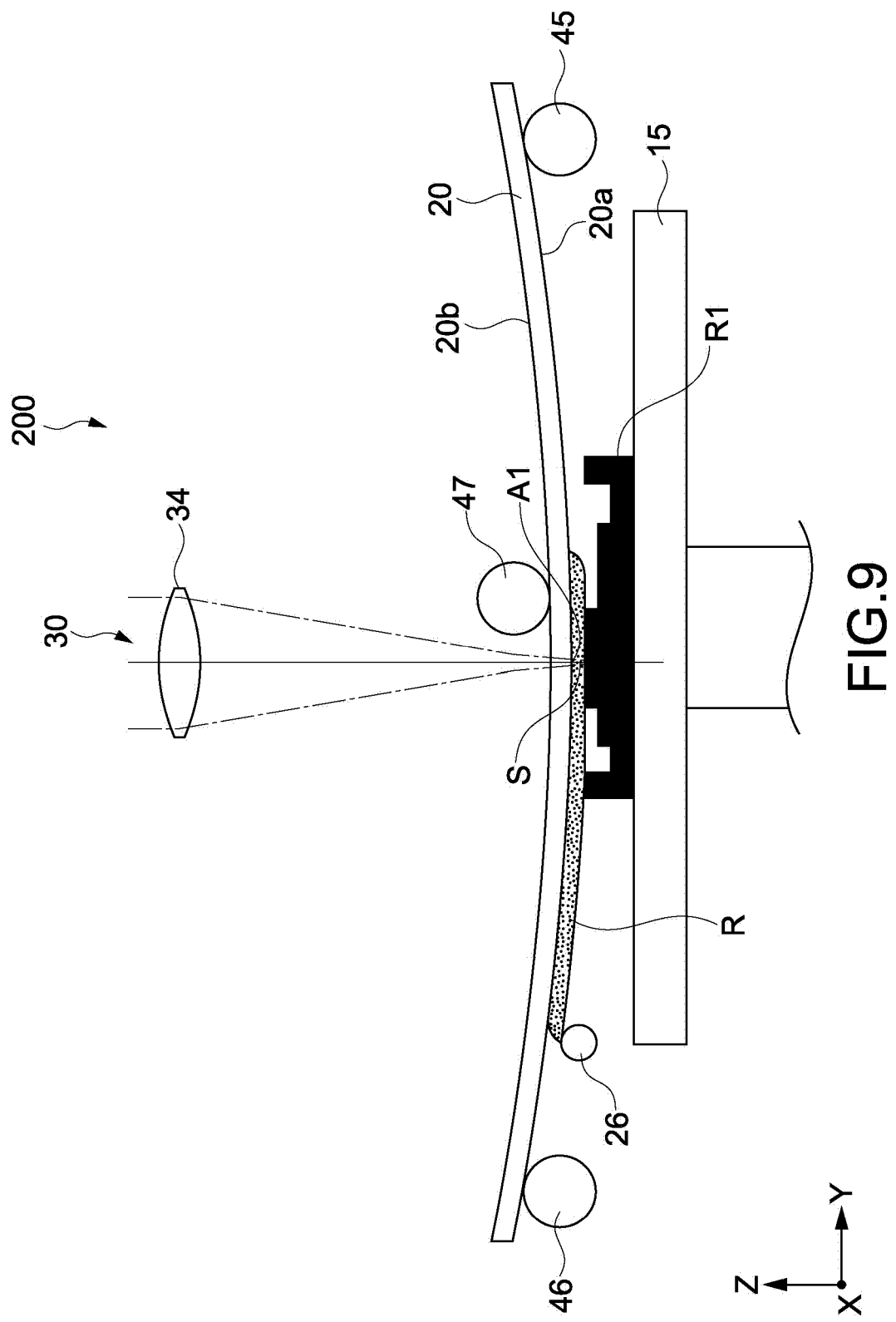
FIG. 9 is a side view showing main parts of a three-dimensional modeling apparatus according to a second embodiment of the present disclosure.

FIG. 9 is a side view showing main parts of a three-dimensional modeling apparatus according to a second embodiment of the present disclosure. In the following, the descriptions of the same members, functions, and the like as those included in the 3-D modeling apparatus 100 according to the embodiment shown in FIG. 1 and the like will be simplified or omitted, and different points will be mainly described.

A three-dimensional modeling apparatus 200 shown in FIG. 9 includes, in place of the above-mentioned drum serving as the constraining body, a plate member 20 including a surface formed as a curved surface. The plate member 20 is typically a part of the cylindrical body. The plate member 20 includes a lower surface 20a and an upper surface 20b. The lower surface 20a is opposed to the modeling stage 15 and is supported by a plurality of guide rollers 45 and 46, for example. The upper surface 20b is held by a guide roller 47. On the upper surface 20b side of the plate member 20, the irradiation unit 30 is arranged.

At least one of those guide rollers 45 to 47 may be driven, or any of the guide rollers may not be driven.

In the lowest part of the lower surface 20a, which is opposed to the modeling stage 15, of the plate member 20 provided as described above, between the linear region A1 that can be considered as a substantially flat surface and the modeling stage 15 (the cured layer R1 on the modeling stage 15), the slit region S is formed.

In the case where the drum 10 being the cylindrical body is used as in the first embodiment, as the diameter of the cylindrical body set to be larger, the curvature of its outer peripheral surface becomes smaller. Thus, the area of the linear region A1 that can be considered as the flat surface can be made to be larger. However, as the diameter of the cylindrical body is set to be larger, the three-dimensional modeling apparatus becomes also larger. In view of this, the constraining body is formed to have a plate shape as in this embodiment. Thus, it is possible to suppress the three-dimensional modeling apparatus 200 from being larger, and to increase the region area of the linear region A1 that can be considered as the flat surface.

It should be noted that the plate member is not limited to the embodiment in which the plate member is a part of the cylindrical body, and the shape as viewed in the side surface in FIG. 9 may be a shape corresponding to an oval or a part of a quadratic curve such as a hyperbola.

Third Embodiment

FIGS. 10A and 10B are a side view and a front view showing main parts of a three-dimensional modeling apparatus according to a third embodiment of the present disclosure, respectively.

A constraining body of a three-dimensional modeling apparatus 210 according to this embodiment is a semi-cylindrical body 40 corresponding to a part of the cylindrical body. That is, each of the semi-cylindrical body 40 and the plate member 20 according to the second embodiment corresponds to a part of the cylindrical body, and they have the same actions and effects except for their different curvatures of the outer peripheral surfaces.

An irradiation unit 80 of the three-dimensional modeling apparatus 210 according to this embodiment includes the laser light source 31 and a condenser lens 134.

The condenser lens 134 has a function of collecting the laser light. The laser light from the irradiation unit 80 scans the resin liquid R along the X-axis direction through a galvanometer mirror 35 of a galvanometer scan mechanism. The galvanometer mirror is set to be rotatable through a motor or an actuator (not shown) by a predetermined angle about a rotational axis along the Y-axis direction for the scan in the X-axis direction.

When such a galvanometer scan mechanism is used, as compared to the scan mechanism of the irradiation unit 30 according to the first embodiment, the scan speed in the X-axis direction can be increased.

Further, the three-dimensional modeling apparatus 210 according to this embodiment exerts the following actions and effects. In the case where the constraining body is formed to have a cylindrical shape, as in the three-dimensional modeling apparatus 100 shown in FIG. 1, the irradiation unit 30 is provided in the inside of the drum 10. In this case, the length of the optical path of the laser light is limited. However, as in this embodiment, as long as the semi-cylindrical body 40 having a shape obtained by cutting out a cylindrical body is used, the limitation on the length of the optical path of the laser light can be eliminated.

The irradiation unit 80 and the galvanometer mirror 35 may be applied to the three-dimensional modeling apparatus 200 shown in FIG. 9.

In place of the galvanometer mirror 35, a rotating polygon mirror may be provided.

Although in the example shown in FIG. 10A, the semi-cylindrical body 40 is provided as if the cylindrical body is obliquely cut, the semi-cylindrical body 40 may be provided so that its cut surface is substantially parallel (horizontal) to the X-Y plane. The cut surface is not limited to be horizontal, any angle may be employed for the cut surface.

The shape of the constraining body is not limited to the semi-cylindrical shape, and the angle for cutting out the cylindrical body is not particularly limited.

Fourth Embodiment

Figure 11:
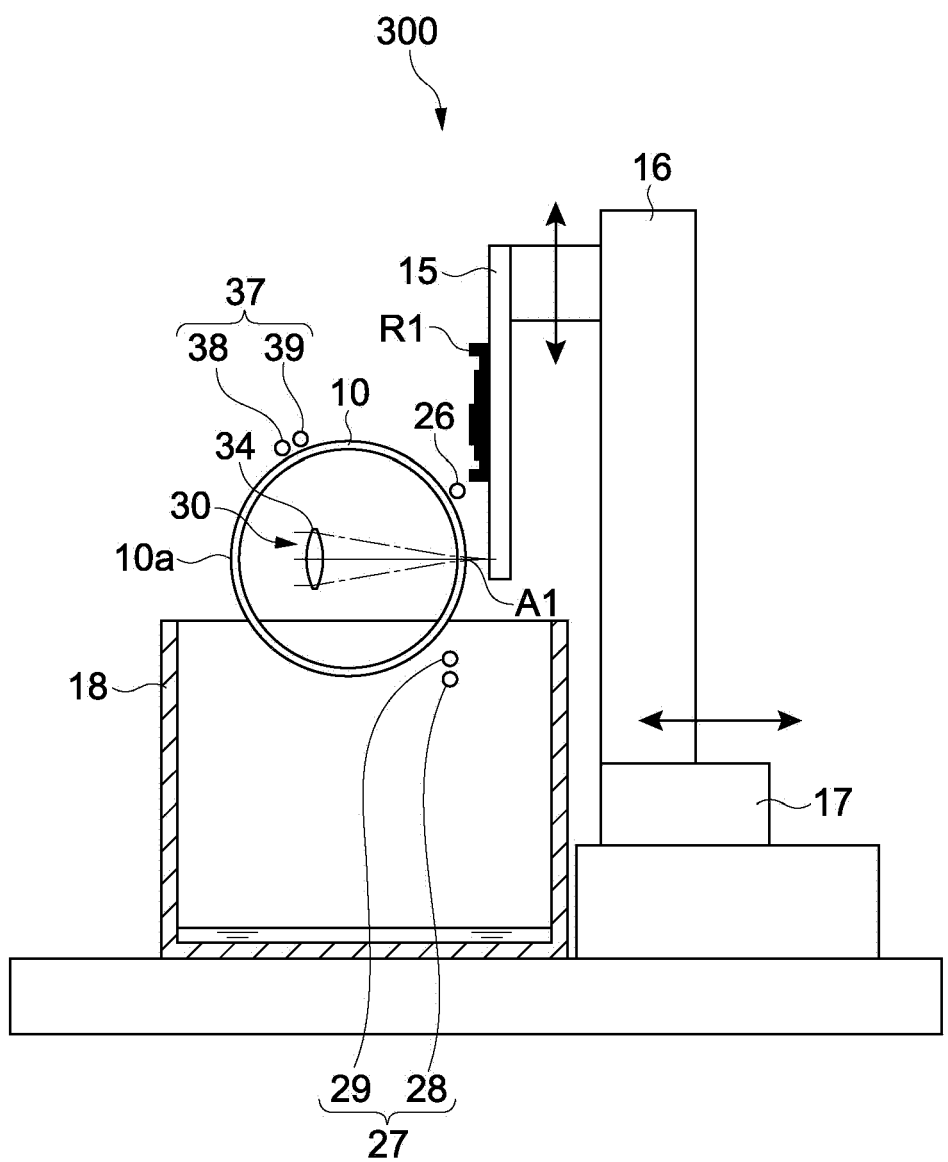
FIG. 11 is a view showing main parts of a three-dimensional modeling apparatus according to a fourth embodiment of the present disclosure.

FIG. 11 is a view showing main parts of a three-dimensional modeling apparatus according to a fourth embodiment of the present disclosure.

A three-dimensional modeling apparatus 300 according to this embodiment includes as the movement mechanism that moves the modeling stage 15, the Y-axis movement mechanism 70, and a Z-axis movement mechanism 17. The Y-axis movement mechanism 70 moves the modeling stage 15 along the vertical direction. The Z-axis movement mechanism 17 moves the Y-axis movement mechanism 70 to approach the drum 10 and be separated from the drum 10. That is, the Z-axis movement mechanism 17 moves the Y-axis movement mechanism 70 horizontally, to thereby cause the modeling stage 15 to approach or be separated from the drum 10. In the description of this embodiment, the vertical direction is referred to as the Y-axis direction, and an approaching and separating direction (horizontal direction) of the modeling stage 15 with respect to the drum 10 is referred to as the Z-axis direction.

It should be noted that regarding the configuration of the Z-axis movement mechanism, instead of moving the modeling stage 15 in the Z-axis direction through the Y-axis movement mechanism 70, the Z-axis movement mechanism 17 may move the modeling stage 15 in the Z-axis direction directly.

It is sufficient that the Z-axis movement mechanism 17 have the same structure as that of the lifting and lowering mechanism described in the above-mentioned embodiment. That is the case with the Y-axis movement mechanism 70. Also the three-dimensional modeling apparatus 300 according to this embodiment includes the irradiation unit 30 and the X-axis movement mechanism 60 (see FIG. 1) similar to the above-mentioned embodiment. In this case, the irradiation unit 30 radiates the laser light toward the stage in the horizontal direction.

At a predetermined position on the outer peripheral surface 10a side of the drum 10, the supply nozzle 26 that supplies the resin liquid is provided. The predetermined position is set, in vicinity of the drum 10, on an upper side in the Y-axis direction with respect to the linear region A1 set at a position at which a distance between the outer peripheral surface 10a of the drum 10 and the top surface of the modeling stage 15 is the minimum.

In vicinity of the drum 10, on a lower side with respect to the linear region A1, a cleaning unit 27 is arranged. The cleaning unit 27 includes a cleaning nozzle 28 and an air blow nozzle 29. The cleaning nozzle 28 supplies, to the object formed on the modeling stage 15, cleaning liquid (cleaning material). For example, the air blow nozzle 29 blows the air to the object. The cleaning nozzle 28 and the air blow nozzle 29 each has a shape long along the X-axis direction, and are arranged along the Y-axis direction in parallel. The cleaning nozzle 28 and the air blow nozzle 29 may be reversed in the vertical direction.

In addition, above the drum 10, a cleaning unit 37 is also arranged, which has the same structure as that of the cleaning unit 27. A cleaning nozzle 38 supplies, to the outer peripheral surface 10a of the drum 10, cleaning liquid. An air blow nozzle 39 blows the air to the outer peripheral surface of the drum 10.

As the cleaning liquid discharged from the cleaning nozzles 28 and 38, for example, ethanol or methanol is used. From the air blow nozzles 29 and 39, another gas such as inert gas may be blown in place of the air.

In the lower part of the drum 10, there is provided a waste tank 18. In the waste tank 18, extra material (resin liquid), the cleaning liquid, and the like are set to be stored.

An operation of the three-dimensional modeling apparatus 300 configured in the above-mentioned manner will be described. Hereinafter, the description will be made of the operation for one layer of the object.

When the supply nozzle 26 supplies the resin liquid to the outer peripheral surface 10a of the drum 10, a guide roller (not shown) that supports the drum 10 is driven. For example, in FIG. 11, the drum 10 is rotated by a predetermined angle in a clockwise direction. When the drum 10 is rotated, the resin liquid adhering the drum 10 is moved to the slit region formed between the linear region A1 of the drum 10 and the modeling stage 15. Alternatively, the resin liquid adhering the drum 10 may flow down the outer peripheral surface 10a due to its own weight and be supplied into the slit region.

The resin liquid is held in the slit region due to its own surface tension.

Then, while the irradiation unit 30 is performing a scan along the X-axis direction, and further, the modeling stage 15 is being downwardly moved along the Y-axis direction from the state shown in FIG. 11 by the stepwise feeding, the resin liquid in the slit region S is irradiated with the laser light. As a result, the cured layer R1 is formed.

Figure 12:
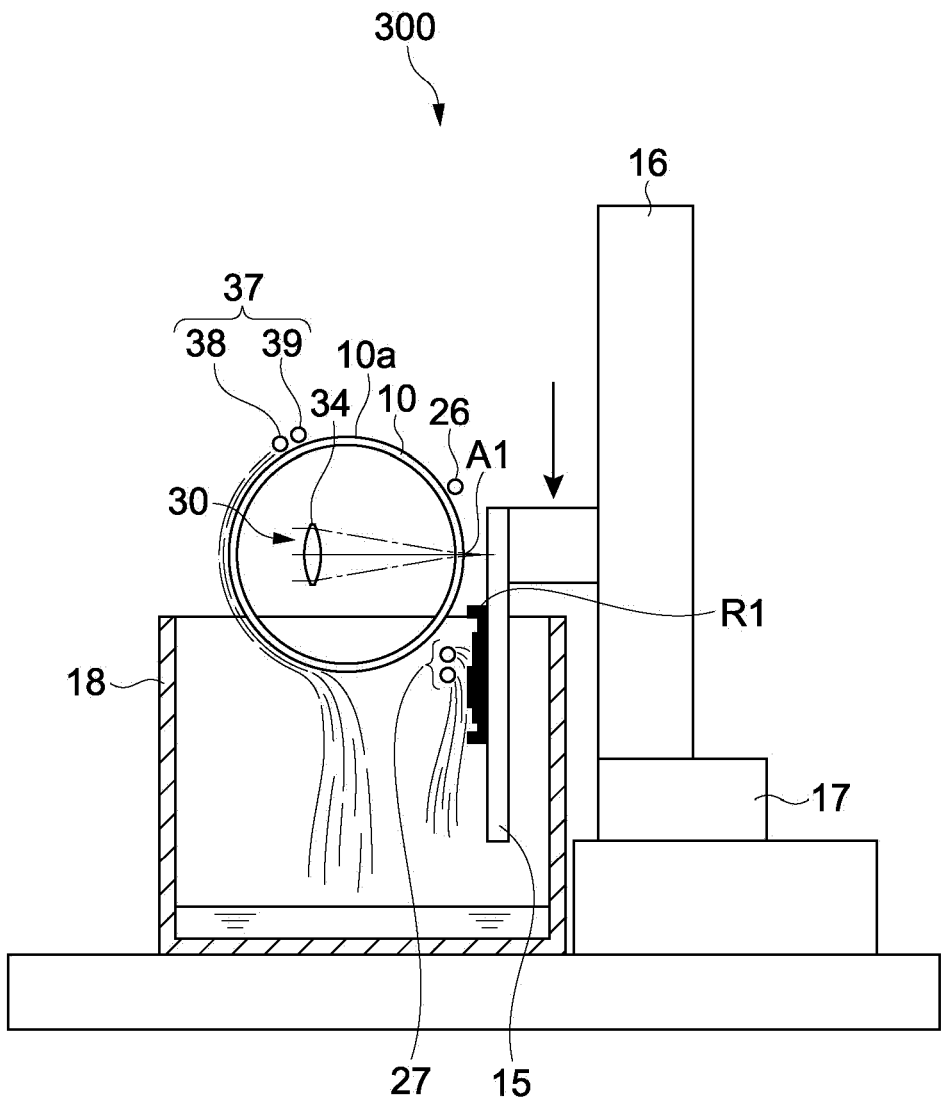
FIG. 12 is a view for describing an operation of the three-dimensional modeling apparatus shown in FIG. 11.

As shown in FIG. 12, until the entire cured layer R1 is positioned below the linear region A1 of the drum 10, the modeling stage 15 is downwardly moved. Then, the cleaning unit 27 supplies the cleaning liquid and the air to the cured layer R1, and, for example, extra resin liquid remaining on the cured layer R1 is removed. Further, the cleaning unit 37 supplies the cleaning liquid and the air to the drum 10, and extra resin liquid adhering to the outer peripheral surface of the drum 10 is also removed.

Such a process for one layer of the object is repeated predetermined times, and the object is formed.

In this embodiment, it is possible to reliably remove the extra material from the cured layer R1 by downwardly flowing the extra material due to the gravity, and to clean the surface of the cured layer R1. Therefore, the modeling with high accuracy can be realized.

The timing of cleaning by the cleaning units 27 and 37 is optional. For example, cleaning by the cleaning units 27 and 37 may be performed for each of the layers of the object or for a plurality of the layers of the object. Alternatively, such a cleaning may be performed throughout the modeling process. The cleaning liquid flows down, and hence in this fourth embodiment, the air blow nozzle is unnecessary.

Fifth Embodiment

FIGS. 13A to 13F are views showing main parts of a three-dimensional modeling apparatus according to a fifth embodiment of the present disclosure.

A three-dimensional modeling apparatus 310 includes a color nozzle unit 48 in place of the supply nozzle 26 of the three-dimensional modeling apparatus 300 according to the fourth embodiment. Except for this, the three-dimensional modeling apparatus 310 has substantially the same configuration as that of the three-dimensional modeling apparatus 300.

The color nozzle unit 48 includes a nozzle 48R that supplies red-colored resin liquid, a nozzle 48G that supplies green-colored resin liquid, and a nozzle 48B that supplies blue-colored resin liquid. That is, the three-dimensional modeling apparatus 310 can form a full color object. The arrangement of the nozzle 48R, 48G, and 48B can be appropriately changed.

Figure 13A:
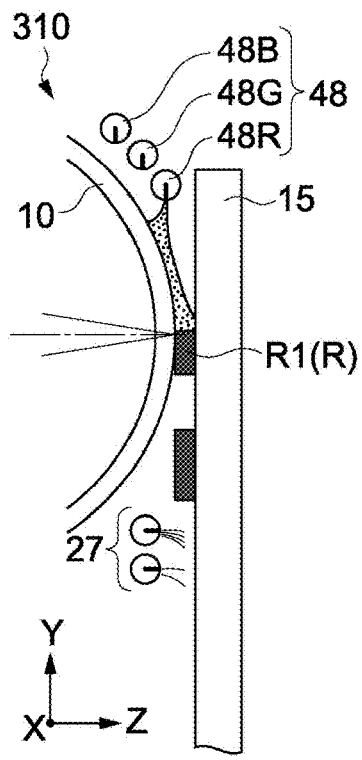
FIGS. 13A to 13F are views showing main parts of a three-dimensional modeling apparatus according to a fifth embodiment of the present disclosure.

As shown in FIG. 13A, the nozzle 48R supplies the red resin liquid into the slit region. While the irradiation unit 30 (see FIG. 11) being moved in the X-axis direction, the red resin liquid supplied into the slit region is irradiated with the laser light from the irradiation unit 30. Further, when by the stepwise feeding, the modeling stage 15 is moved in the Y-axis direction, red cured layer pieces R1(R) for one layer are formed. Then, as shown in FIG. 13B, the cleaning unit 27 removes extra resin liquid.

Figure 13C:
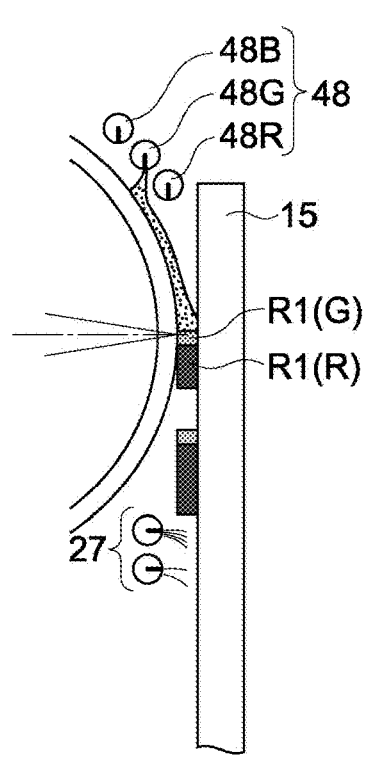
Figure 13E:
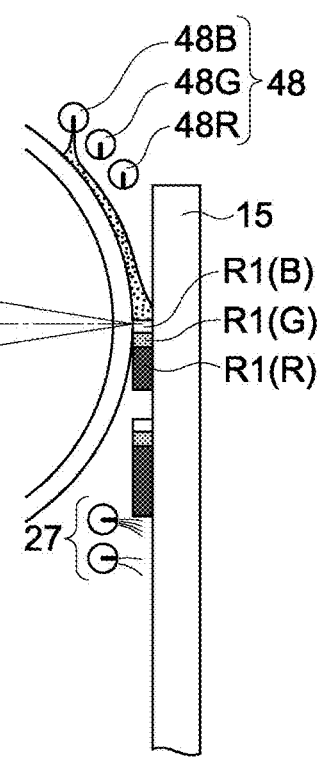
Figure 13B:
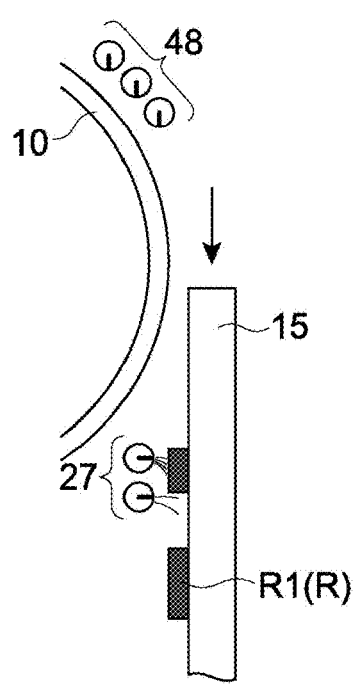
Figure 13D:
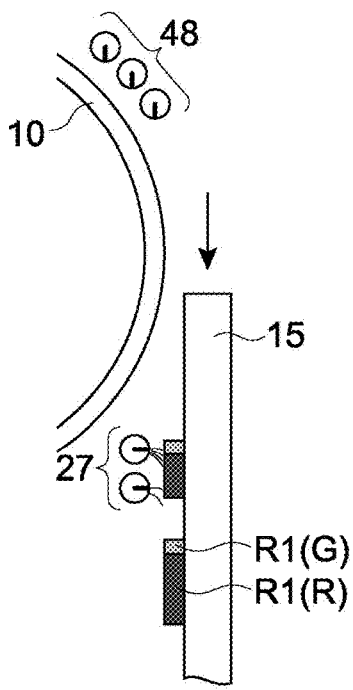
Figure 13F:
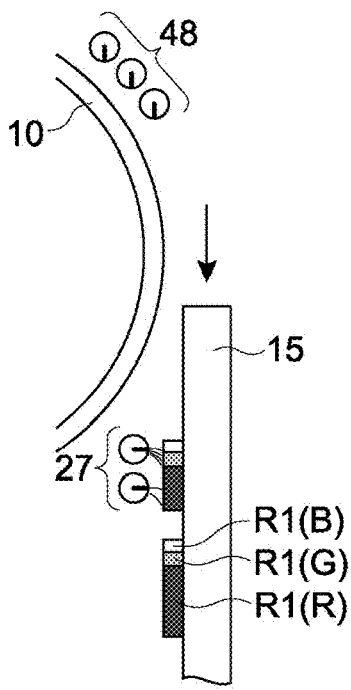

Similarly to FIGS. 13A and 13B, in FIGS. 13C and 13D, in the same layer as the cured layer pieces R1(R) formed of the red resin liquid, a cured layer pieces R1(G) are formed of the green resin liquid. Further, similarly, as shown in FIGS. 13E and 13F, in the same layer as those cured layer pieces R1(R) and R1(G), cured layer pieces R1(B) are formed of the blue resin liquid. With this, the cured layer pieces for one layer are formed. In FIGS. 13A to 13F, the same-color cured layer pieces do not exist in the X-axis direction, but the red, green, and blue cured layer pieces are mixed also in the X-axis direction.

The spot diameter of the laser light from the irradiation unit can be appropriately set, and hence the colored object can be formed, which ranges from low definition to high definition depending on the resolution of the irradiation of the laser light. For example, when the spot diameter of the laser light is about 10 μm, high definition coloring can be performed.

As described above, in this embodiment, the modeling stage 15 is moved in the vertical direction, and hence it becomes easier to remove the extra material. Thus, it becomes easier to remove the extra material for each layer, and further, it becomes easier to form an object having various colors for each layer.

According to this embodiment, it is possible to color also the inside of the object. Therefore, for example, when the user cut the object, he or she can find its section colored. Thus, also when the user wants to express the structure of the section of the object, this embodiment has a merit.

It should be noted that, in this embodiment, in place of the resin liquid of the RGB, resin liquid of cyan, magenta, yellow (CMY) may be used.

By using transparent resin liquid in addition to the RGB or the CMY, it is also possible to form a transparent object colored in its inside or its outer surface.

By using white resin liquid in addition to the RGB or the CMY, the white can be a base color for the object. With this, it is possible to realize an object colored more clearly.

By using white resin liquid and black resin liquid in place of the RGB or the CMY, an object in grayscale may be formed.

Alternatively, other than the embodiment in which a plurality of materials having different colors are used, an embodiment in which a plurality of materials are different in properties is also conceivable. Being different in properties means being different in rigidity, density, absorbance of light, viscosity, conductance, magnetism (non-magnetism), and the like. It is needless to say that the method of using the plurality of materials is not limited to the case where it is applied to the embodiment in which the cleaning unit 27 performs cleaning for each layer, but it can also be applied to the first to third embodiments.

Sixth Embodiment

Figure 14:
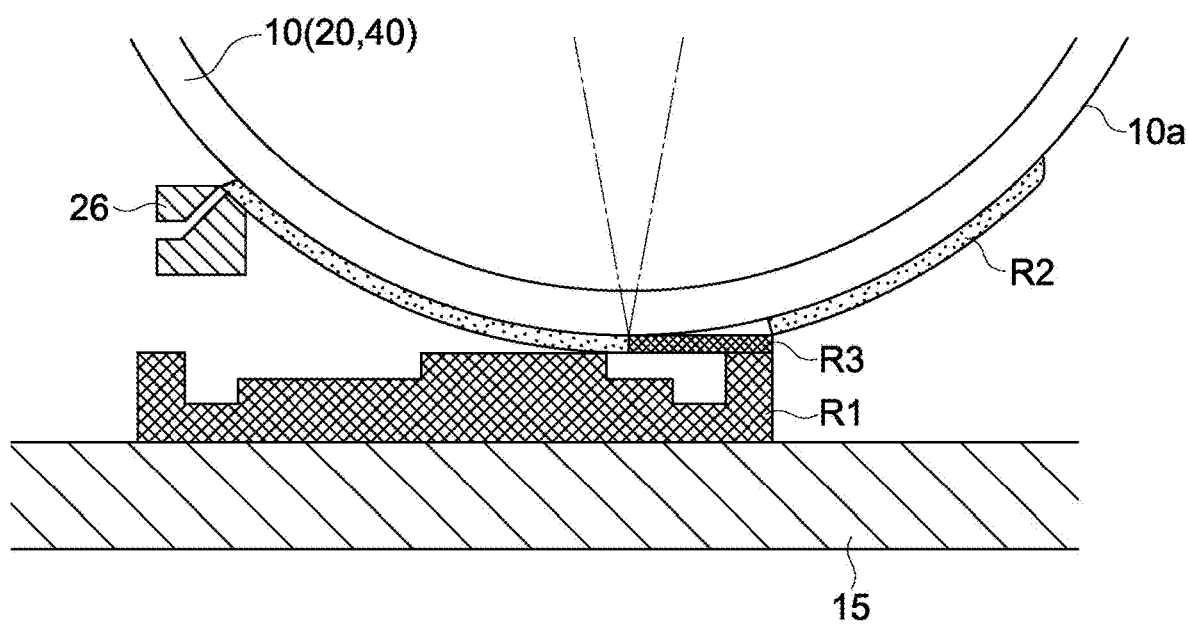
FIG. 14 is a view for describing a sixth embodiment of the present disclosure.

FIG. 14 is a view for describing a sixth embodiment of the present disclosure.

In this embodiment, as the supply nozzle that supplies the resin material, a slit coating nozzle 26 is used. Further, as the resin material, thixotropic material is used. Any of the drum 10, the plate member 20, the semi-cylindrical body 40, and the like can be used as the constraining body as long as it has the linear region A1.

The slit coating nozzle 26 supplies thixotropic resin liquid R2, and as shown in the drawing, a thin film having an overhang shape is formed.

In the past, as a method of forming an object having an overhang-like part, for example, there has been the following method. Specifically, in this method, light-curing resin material containing an additive light absorbent is used, and the intensity of the laser light to be radiated is controlled, to thereby limit the depth at which the light-curing resin material is cured. However, in this method, it may be impossible to control the curing depth precisely, and to control the surface roughness of the overhang-like part.

In this embodiment, the thixotropic material R2 is used, and hence it becomes possible to form an overhang-like part R3 with high accuracy irrespective of the curing depth.

Further, in this embodiment, by using the nozzle 26 of the slit coating type, the thin film having the overhang shape can be formed.

In particular, the constraining body having the linear region A1 is used, and hence as described above, the separation force of the object from the constraining body (drum 10) is made to be very small, and the stress to be applied to the object is made to be very small. Thus, a thin overhang-like part can be formed.

The film thickness of the overhang-like part R3 may be set to be smaller than the wall thickness of the drum 10.

As compared to the intensity of the laser light for forming the cured layer (the cured layer R1 in the lower portion of the object) other than the overhang-like part R3, the intensity of the laser light for forming the overhang-like part R3 may be set to be larger. With this setting, it is possible to reliably cure the resin liquid of the overhang-like part R3.

The material for the cured layer (the cured layer R1 in the lower portion of the object) other than the overhang-like part R3 may be different from the material for the overhang-like part R3. In this case, it is sufficient to provide supply nozzles that supply their materials, respectively. For example, the fourth embodiment and the fifth embodiment may be applied to the sixth embodiment.

The thixotropic material R2 may be applied to the first to fifth embodiments.

In place of the thixotropic material R2, gelatinous material formed to have a film shape may be wound around the outer peripheral surface 10a of the drum 10, and the gelatinous material may be exposed to the light, to thereby form the overhang-like part R3.

Figure 15A:
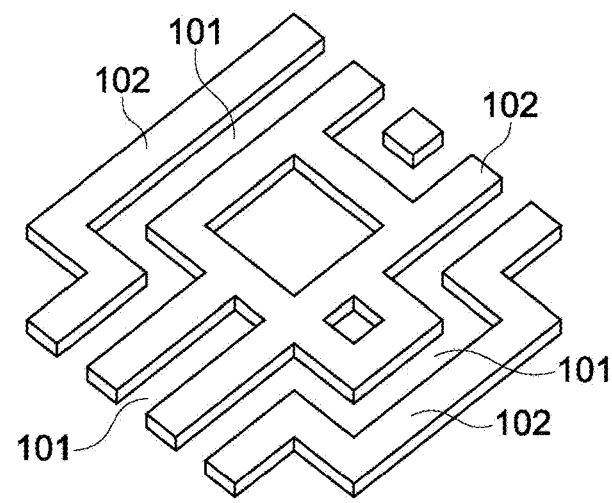
FIGS. 15A to 15C are views showing an example of an object having an overhang-like part.
Figure 15B:
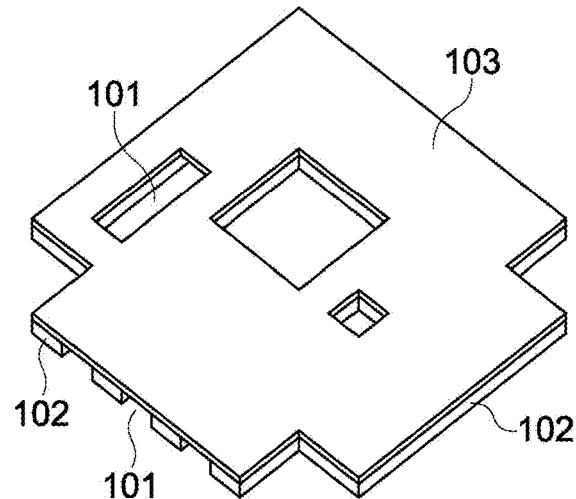
Figure 15C:
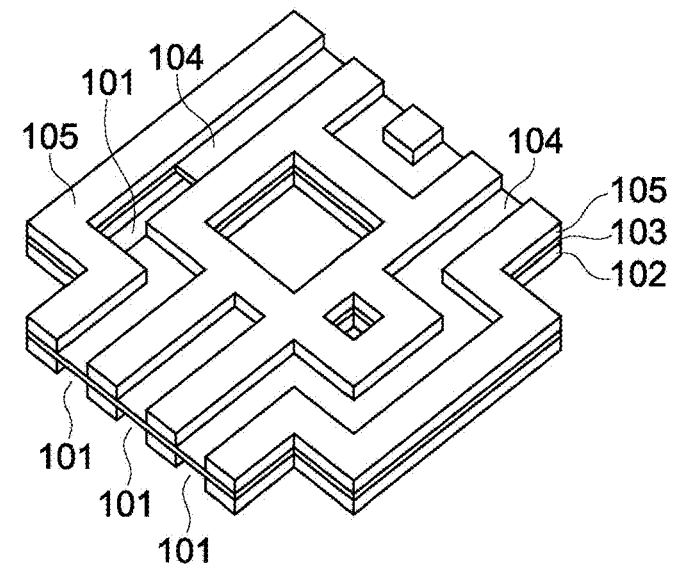

FIGS. 15A to 15C are view showing an example of an object including an overhang-like part. This object is applied to, for example, a micro channel device.

On cured layer pieces 102 that form channels 101, which are formed as shown in FIG. 15A, a cover member 103 is formed as a thin film including an overhang-like part as shown in FIG. 15B. Then, as shown in FIG. 15C, on that cover member 103, cured layers 105 that form channels 104 are further formed. In this manner, in this embodiment, the micro channel device having stereoscopic channels can be formed as the object.

In such a micro channel device, a passive electrical circuit (capacitor, inductor, resistor, and the like) can be constructed by flowing plating liquid into the channels to plate the channels. Further, similarly by plating, the strength can be increased.

Seventh Embodiment

Figure 16:
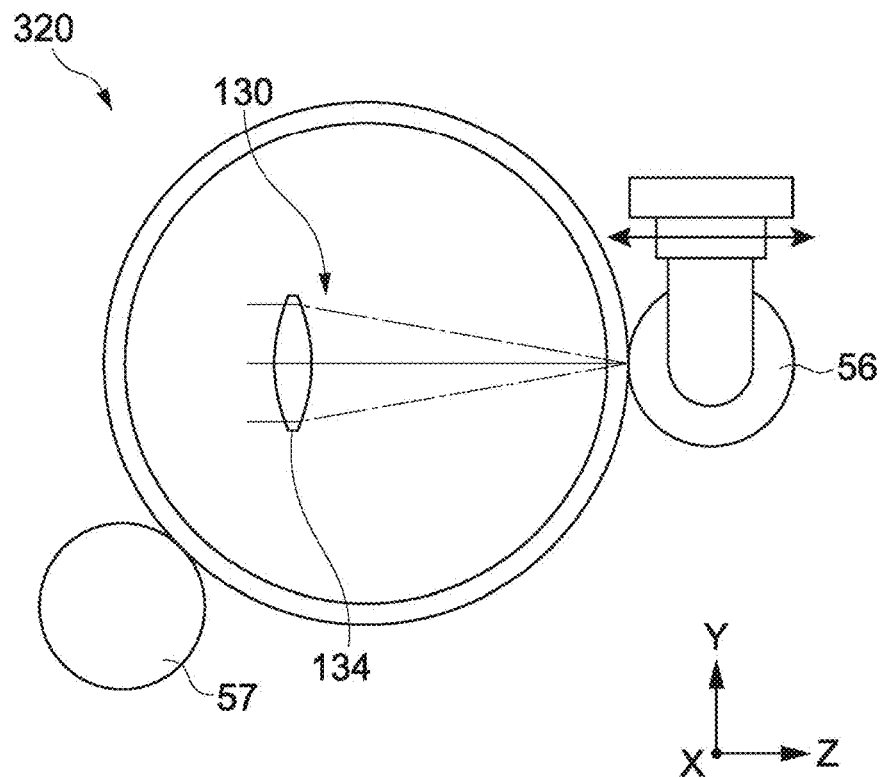
FIG. 16 is a view showing main parts of a three-dimensional modeling apparatus according to a seventh embodiment of the present disclosure.
Figure 17:
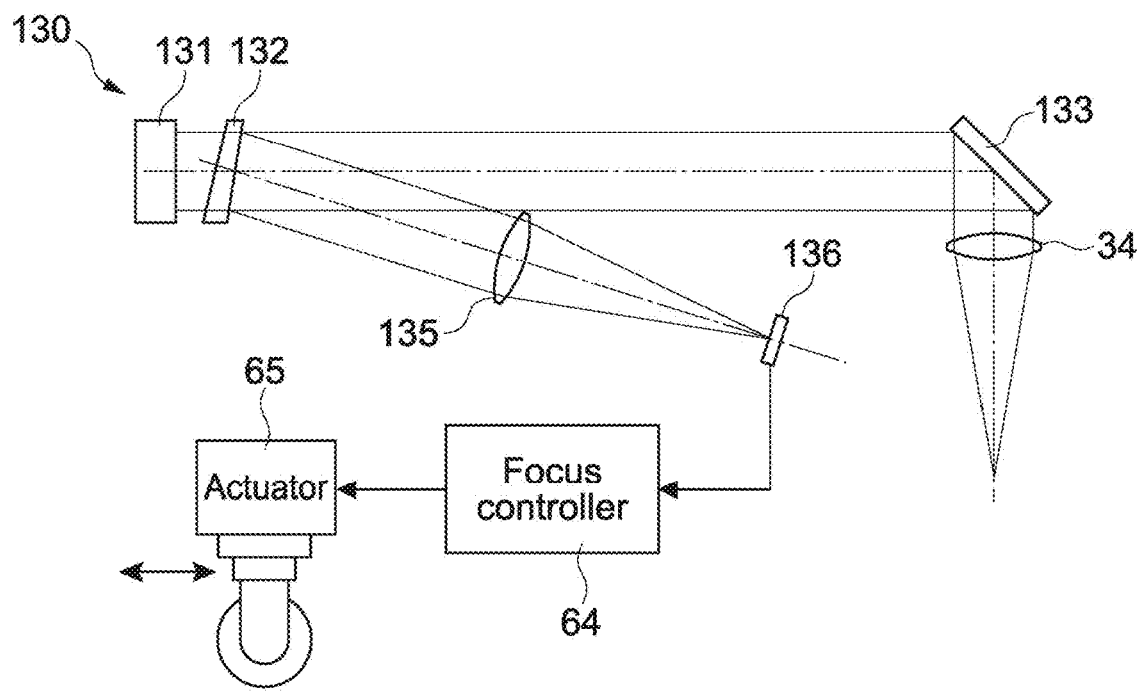
FIG. 17 is a view of an optical system to be used in the three-dimensional modeling apparatus shown in FIG. 16 and a block diagram of an electrical configuration therefor.

FIGS. 16 and 17 are views showing main parts of a three-dimensional modeling apparatus according to a seventh embodiment of the present disclosure.

The three-dimensional modeling apparatus 320 according to this embodiment includes a drum-position controlling mechanism. The drum-position controlling mechanism serves to control the position of the drum 10 serving as the constraining body in the optical axis direction (Z-axis direction) of the laser light. It should be noted that the three-dimensional modeling apparatus 320 shown in FIG. 16 is, for example, an apparatus of such a type that the modeling stage 15 is moved in the vertical direction as shown in FIG. 11, and the like.

The laser light from the irradiation unit 130 is radiated through the drum 10 onto the modeling stage (not shown). Thus, in order to keep the focused state of the laser light, it is necessary to set the position of the drum 10 in the Z-axis direction to a predetermined position. In view of this, the drum-position controlling mechanism controls the position of the drum 10, to thereby keep the focused state of the laser light. Further, due to the control of the position of the drum 10, the film thickness of the resin material can be controlled with high accuracy.

In FIG. 16, in four guide rollers 56 and 57 (guide rollers 56 and 57 are arranged also in the X-axis direction on the sheet of FIG. 16) support the drum 10.

To two guide rollers 56 of those four guide rollers, an actuator 65 (see FIG. 17) including a piezo element and the like, and capable of moving the positions of those guide rollers along the Z-axis direction are connected.

The irradiation unit 130 includes a laser light source 131, a mirror 133, the objective lens 34, a beam sampler 132, a condenser lens 135, and an optical detector 136. The beam sampler 132 samples a part of the laser light emitted from the laser light source 131. The condenser lens 135 collects the light emitted from the beam sampler 132 to the optical detector 136.

The optical detector 136 converts the state of the obtained intensity distribution into an electrical signal, and outputs this signal to a focus controller 64. The focus controller 64 controls the driving of the actuator 65 so as to keep the focused state of the laser light on the basis of the input signal of the intensity distribution, for example. In this case, the guide rollers 56, the actuator 65, and the focus controller 64 serve as the control mechanism. Due to the driving of the actuator 65, the guide rollers 56 are moved along the Z-axis direction. In this manner, the position of the drum 10 in the Z-axis direction is controlled.

Such a drum-position controlling mechanism can be applied also to the three-dimensional modeling apparatuses each including the modeling stage that is moved horizontally as in the first to third embodiments, and the sixth embodiment.

It should be noted that the focus controller 64 may not only control the driving of the actuator 65, but also control the driving of the Z-axis movement mechanism 17 (see FIG. 11 and the like) that moves the modeling stage 15 in the Z-axis direction.

Eighth Embodiment

Figure 18:
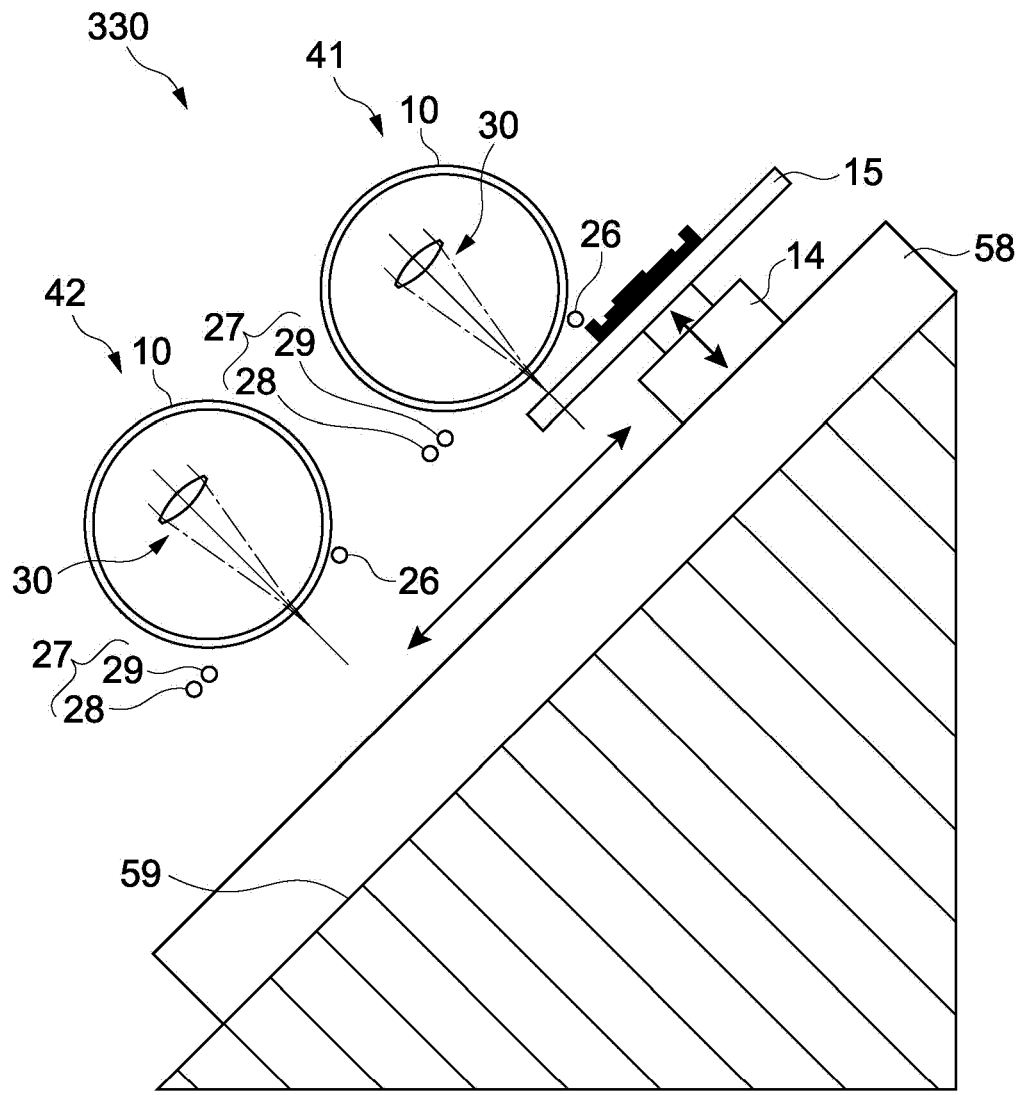
FIG. 18 is a view showing main parts of a three-dimensional modeling apparatus according to an eighth embodiment of the present disclosure.

FIG. 18 is a view showing main parts of a three-dimensional modeling apparatus according to an eighth embodiment of the present disclosure.

A three-dimensional modeling apparatus 330 according to this embodiment includes an oblique surface 59. Along the oblique surface 59, there are arranged a first set 41 provided on an upper side and a second set 42 provided on a lower side. Each of the first set 41 and the second set 42 includes the drum 10, the irradiation unit 30, an X-axis movement mechanism (not shown) that causes the irradiation unit 30 to perform a scan, the supply nozzle 26, and the cleaning unit 27. The cleaning unit 27 includes, as described above, the cleaning nozzle 28 and the air blow nozzle 29.

The first set 41 is different from the second set 42 in that the supply nozzles 26 supply different materials. The difference of the materials is a difference in at least one of color and properties as described above.

The three-dimensional modeling apparatus 330 includes an oblique movement mechanism 58 that moves the modeling stage 15 and the lifting and lowering mechanism 14, which lifts and lowers the modeling stage 15, along the oblique surface 59. The angle of the oblique surface 59 with respect to the horizontal surface is set to range from 30 to 70°, for example. However, the angle is not limited to such a range. In this case, the lifting and lowering mechanism 14 lifts and lowers the modeling stage 15 in a direction (stacking direction of the modeling) substantially perpendicular to the oblique surface 59.

An operation of the three-dimensional modeling apparatus 330 configured in the above-mentioned manner will be described.

First, the modeling stage 15 is lowered from an initial position, at which the modeling stage 15 waits on the upper side as shown in FIG. 18, along the oblique surface 59. Then, the first set 41 performs an exposure process and a cleaning process on the modeling stage 15.

The exposure process and the cleaning process are as described above with reference to FIGS. 11 and 12. Extra resin liquid and cleaning liquid, which flow down during the exposure process and the cleaning process, pass through a discharge channel provided along the oblique surface 59 and discharged into a waste tank (not shown) or the like.

When the first set 41 terminates the exposure process and the cleaning process, the modeling stage 15 is further lowered. Then, the second set 42 performs an exposure process and a cleaning process on the modeling stage 15. The second set performs the processes so that a layer having the same height (height in lifting and lowering direction of the lifting and lowering mechanism 14) as that of the cured layer formed by the first set 41 is formed, in other words, without changing the height of the modeling stage 15 between the first set 41 and the second set 42.

When the second set 42 terminates the exposure process and the cleaning process, the modeling stage 15 repeats the processes from the first set 41.

As described above, in this embodiment, the modeling stage 15 is moved along the oblique surface 59, and the two sets 41 and 42 perform the modeling processes with the different materials. Here, in the exposure process and the cleaning process by the first set 41, the extra resin liquid and the cleaning liquid flow down due to the gravity in the vertical direction, which prevents the resin liquid and the cleaning liquid from being dispersed and adhering to the second set 42. This is a merit when the oblique surface 59 is used.

In this manner, the modeling process is performed with the two kinds of materials while the cleaning unit 27 is performing the cleaning for each layer. As a result, similarly to the embodiment shown in FIG. 13, it is possible to form the object containing the two kinds of materials with high accuracy.

Comparing the fifth embodiment shown in FIG. 13 to this embodiment, it is necessary in the fifth embodiment to move the modeling stage 15 back to the initial position for each supply of one kind of resin liquid, but this movement is unnecessary in this embodiment, which is a merit of this embodiment. However, the three-dimensional modeling apparatus 310 according to the fifth embodiment has a merit that the size of the apparatus, for example, the footprint of the apparatus can be reduced and the number of components thereof can be reduced as compared to the three-dimensional modeling apparatus 330 according to this embodiment.

Although in the above description, the two sets 41 and 42 are provided, three or more sets may be provided in order to supply three or more kinds of materials.

Although in the above description, the cured layer pieces having the same height are formed of the different materials by the two sets 41 and 42, cured layer pieces having the different heights may be formed of the same material by the two sets 41 and 42.

Although in this embodiment, the oblique surface 59 is provided, the plurality of sets each including drums 10 and the like may be arranged along a horizontal surface.

The irradiation unit 30 may not be provided for each of the first set 41 and the second set 42. In this case, it is sufficient that for example, as the constraining body, the drum 10 be replaced by the plate member 20 shown in FIG. 9 or the semi-cylindrical body 40 shown in FIG. 10, and a component that moves the irradiation unit 30 between the sets 41 and 42 be provided.

Ninth Embodiment

Figure 19:
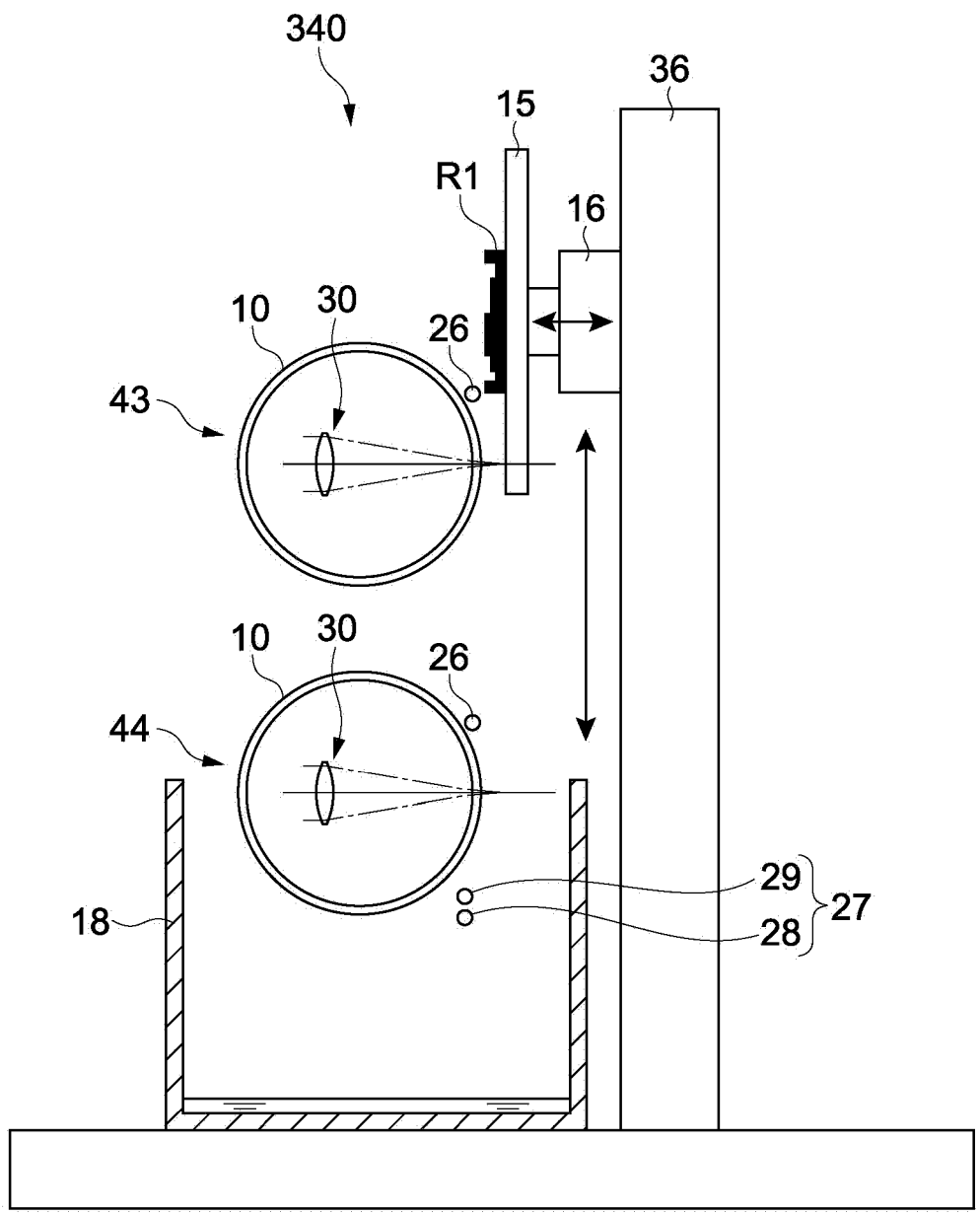
FIG. 19 is a view showing main parts of a three-dimensional modeling apparatus according to a ninth embodiment of the present disclosure.

FIG. 19 is a view showing main parts of a three-dimensional modeling apparatus according to a ninth embodiment of the present disclosure.

The three-dimensional modeling apparatus 340 according to this embodiment includes a Y-axis movement mechanism 36 that moves, along the Y-axis direction being the vertical direction, the modeling stage 15 and a Z-axis movement mechanism 16. Further, a first set 43 and a second set 44 are arranged along the Y-axis direction.

The first set 43 includes the drum 10, the irradiation unit 30, the supply nozzle 26, and an X-axis movement mechanism (not shown). The second set 44 includes, in addition to the components included in the first set 43, the cleaning unit 27. The supply nozzles 26 of two sets 43 and 44 supply different kinds of materials.

An operation of the three-dimensional modeling apparatus 340 configured in the above-mentioned manner will be described.

From an initial position of the modeling stage 15 as shown in the drawing, the modeling stage 15 is lowered, and the first set 43 performs an exposure process on the modeling stage 15. After the first set 43 terminates the exposure process, before the modeling stage 15 is lowered or while the modeling stage 15 is being lowered, the Z-axis movement mechanism 16 retracts the modeling stage 15 along the Z-axis direction by a predetermined distance. In order to prevent the cured layer R1 formed by the first set 43 from interfering the second set 44, the modeling stage 15 is retracted by a predetermined distance as described above.

When the modeling stage 15 is lowered to a position at which the formed cured layer R1 can be cleaned by the cleaning unit 27, the cleaning by the cleaning unit 27 is performed on the cured layer R1, and extra resin liquid and cleaning liquid are discharged into the waste tank 18.

When the cleaning unit 27 terminates the cleaning process, the modeling stage 15 is lifted up to a position at which an exposure process by the second set 44 can be performed. Then, the modeling stage 15 is returned by the distance, by which the modeling stage 15 has been retracted along the Z-axis direction. After that, the second set 44 supplies resin liquid of different kind from that of the resin liquid supplied by the first set 43, and the exposure process is performed on the same layer (layer having the same height in the stacking direction) as that of the layer processed by the first set 43.

When the second set 44 terminates the exposure process, the modeling stage 15 is lowered to a position at which the formed cured layer R1 can be cleaned by the cleaning unit 27. Then, the cleaning unit 27 performs the cleaning of the cured layer R1, and extra resin liquid and cleaning liquid are discharged into the waste tank 18.

The above-mentioned operation is repeated on a layer by layer basis of the cured layer.

As described above, also in this embodiment, the plurality of different materials can be supplied. Further, the cleaning unit cleans the cured layer R1. Thus, it is possible to form the object containing the plurality of materials with high accuracy.

Other Embodiments

Embodiments according to the present disclosure are not limited to the above-mentioned embodiments, and other various embodiments can be made.

In each of the above-mentioned embodiments, the modeling stage 15 has a structure of moving in two axis of the Y-axis and the Z-axis. In addition to the structure of moving the two axes, a rotation mechanism that rotates the modeling stage 15 about the stacking direction (Z-axis direction) of cured layers may be provided. For example, in a case of performing a scan with the laser light only in the X-axis direction (a predetermined direction), in some conditions of the modeling process, after the object is removed from the modeling stage 15, there is a fear that deformation (sink mark or warp) may generate in the object. However, by the above-mentioned rotation mechanism, a scan with the laser light can be performed in a desired direction. For example, while the modeling stage is rotated by a predetermined angle for each layer, for a plurality of layers, or randomly, the object is formed, and hence such deformation of the object can be prevented. The predetermined angle means, for example, an angle of 30°, 90°, 180°, or the like, the combination thereof, or a random angle.

In each of the above-mentioned embodiments, the surface of the constraining body (for example, the outer peripheral surface 10a of the drum 10) may be provided with a protective film. Specifically, a protective film is wound around the surface of the constraining body. With this, rather than by cleaning the surface of the constraining body, by regularly removing the protective film, the surface of the constraining body can be made to be clean. Alternatively, on the surface of the constraining body, the protective film such as Teflon (registered trademark) that can suppress the resin liquid and the like from remaining thereon may be formed in advance. In this case, for example, it is possible to make the surface clean by simple cleaning or gas blow.

For the protective film, a material transmissive to the energy ray is used. For forming the protective film of the light transmissive material, for example, polycarbonate, polyethylene, polyvinyl chloride, or the like is used.

Although in each of the above-mentioned embodiments, the irradiation unit radiates one laser beam, a plurality of laser beams may be radiated. For example, so that a period of time when all of the plurality of laser beams are radiated includes a period of time when at least two laser beams of the plurality of laser beams are being radiated simultaneously, irradiation mechanisms therefor are controlled by the control unit. Typically, all of the laser beams are radiated substantially at the same time. With this, the exposure process in a wide range on the material can be realized at a time, and hence the period of time necessary for the modeling process can be reduced. In the case of this example, a plurality of laser light sources may be provided, or n (n is integer equal to or larger than 1) light sources may be used and the laser beam may be split into a plurality of laser beams, to thereby form n+1 or more laser beams.

Although in the above description, in order to form the colored object, for example, the colored resin liquid is used. In place of this resin liquid, material obtained by mixing colored filler into resin liquid may be used. For example, material obtained by mixing colored microparticles each having a size smaller than the minimum stacking thickness of the object into resin liquid may be used. As the microparticles, glass, resin, metal powder, starch, plaster, salt, sugar, or the like is used.

Alternatively, as the filler, for example, transparent or white filler may be used, and such a filler may be colored with dye.

If the stacking thickness of the object is sufficiently small, a beautiful full color object can be formed only by using one color for each layer.

The material for the object is not limited to the light-curing material, but material curable by thermal energy, an electron beam, or an ultrasonic wave may be used. Further, depending on the material, the energy ray radiated from the irradiation unit can also be appropriately changed. As the energy ray, there can be exemplified, in addition to the ultraviolet ray, an infrared ray, visible light, an electron beam, a heat ray, and an ultrasonic wave. The heat ray may be an infrared ray, and in this case, the curing process is performed by spot heating with an infrared laser. The heat ray, the ultrasonic wave, or the like is used, for example, in order to form an object having relatively low modeling accuracy.

In the above-mentioned embodiment, the guide rollers 5 and the like are illustrated as the mechanism that supports the constraining body (the drum 10, the plate member 20, the semi-cylindrical body 40, or the like) so as to be rotatable. However, the guide rollers may be replaced by bearings. In this case, it is sufficient that a support member including a rotational shaft support the constraining body, and the bearings be connected to the rotational shaft.

Although in the above-mentioned embodiment, the modeling stage 15 is moved in the Y-axis direction is employed, the constraining body and the irradiation unit may be moved in the Y-axis direction.

In a case of using the drum 10 as the constraining body, if high modeling accuracy is not desired, the drum 10 may have a solid structure.

As shown in FIG. 9, as the constraining body, the plate member 20 including the curved surface may be replaced by the plate member including the flat surface, and this plate member may be supported so as to be deflected due to its own weight. As the support mechanism, the guide rollers as shown in FIG. 9 may be used.

In the three-dimensional modeling apparatus according to each of the above-mentioned embodiments, in order to remove the extra resin liquid of the cured layer, a roller or a squeegee may be provided. The roller or the squeegee may be provided in place of the cleaning unit 27.

In the first and second embodiments, the cleaning unit for removing the extra resin liquid may be provided as in the fourth embodiment (see FIGS. 11 and 12). In this case, without the cleaning nozzle, only the air blow nozzle may be provided.

At least two of the features in the above-mentioned embodiments may be combined. For example, the plate member 20 or the semi-cylindrical body 40 may be applied to each of the fourth to ninth embodiments and the embodiments described in the section of "[Other embodiments]." Finally, appropriately combining such features will be obvious for those skilled in the art. The present disclosure contains subject matter related to that disclosed in Japanese Priority Patent Application JP 2010-183640 filed in the Japan Patent Office on 19 Aug. 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A three-dimensional modeling apparatus, comprising:
a movable stage;
a rigid rotatable cylinder comprised of a rigid cylindrical constraining body having a curved rigid surface that includes a linear region oriented along a first direction parallel to an axis of rotation of the rigid cylindrical constraining body, wherein the curved rigid surface has a fixed radius of curvature, wherein the rigid cylindrical constraining body is arranged so as to be opposed to the stage so that the linear region of the curved rigid surface is closest to the stage, and wherein the rigid cylindrical constraining body has a hollow internal region;
a supply nozzle configured to supply a material to the curved rigid surface of the rigid cylindrical constraining body, wherein the material is delivered into a slit region formed of a gap between the stage and the linear region via rotation of the rigid cylindrical constraining body, wherein a thickness of the material is determined by the gap, and wherein the material is curable by energy of an energy ray;
a movable irradiation unit located in the hollow internal region of the rigid cylindrical constraining body, the irradiation unit being configured to irradiate the material with the energy ray by focusing the energy ray to pass as a focused spot through the rigid cylindrical constraining body to the material in the slit region, wherein the irradiation unit is movably supported by a guide rail such that the irradiation unit is movable in a direction parallel to the axis of rotation of the rigid cylindrical constraining body;
a guide roller configured to support rotation of the rigid cylindrical constraining body; and
a processor configured to operate at least one movement mechanism to move the stage relative to the rigid cylindrical constraining body along a second direction different from the first direction to form a cured layer of the material, the processor being configured to operate the at least one movement mechanism to place the stage at a first position along the second direction and at a second position along the second direction,
wherein at both the first and second positions the stage is aligned with the rigid cylindrical constraining body along a stacking direction that is different from the second direction,
wherein the processor is further configured to operate the at least one movement mechanism to move the stage relative to the rigid cylindrical constraining body along the stacking direction to create a stack of a plurality of the cured layer of the material.

2. The three-dimensional modeling apparatus according to claim 1, wherein the curved rigid surface that includes the linear region is part of an outer peripheral surface of the rigid cylindrical constraining body.

3. The three-dimensional modeling apparatus according to claim 2, wherein the hollow internal region of the rigid cylindrical constraining body is a hollow cylindrical region, and the irradiation unit is arranged inside of the hollow cylindrical region.

4. The three-dimensional modeling apparatus according to claim 1, wherein the guide roller is adjacent the slit region.

5. The three-dimensional modeling apparatus according to claim 1, further comprising a drive portion configured to drive the guide roller.

6. The three-dimensional modeling apparatus according to claim 1, further comprising a cleaning nozzle configured to supply a cleaning material to an object formed on the stage.

7. The three-dimensional modeling apparatus according to claim 1, wherein
the supply nozzle includes a plurality of supply nozzles, and
the plurality of supply nozzles are configured to discharge different materials.

8. The three-dimensional modeling apparatus according to claim 1, wherein the supply nozzle includes a nozzle of a slit coating type.

9. The three-dimensional modeling apparatus according to claim 1, wherein the supply nozzle is configured to supply a material having a thixotropy as the material.

10. The three-dimensional modeling apparatus according to claim 1, wherein
the rigid cylindrical constraining body and the supply nozzle are among a plurality of rigid cylindrical constraining bodies and a plurality of supply nozzles included in the apparatus, with each of the plurality of rigid cylindrical constraining bodies and each of the plurality of supply nozzles being correspondingly paired with each other to form a plurality of paired sets of rigid cylindrical constraining bodies and supply nozzles, and
the plurality of paired sets of rigid cylindrical constraining bodies and supply nozzles are arranged along the second direction along which the at least one movement mechanism is configured to move the stage.

11. The three-dimensional modeling apparatus according to claim 1, wherein the irradiation unit radiates the energy ray so as to form a main body being a target to be modeled and an anchor pattern arranged in at least a part of a periphery of the main body of the object.

12. The three-dimensional modeling apparatus according to claim 1,
wherein the irradiation unit includes
a generation source configured to generate the energy ray, and
a detector configured to detect an intensity distribution of the energy ray generating from the generation source, and
further comprising a control mechanism configured to control relative positions between the rigid cylindrical constraining body and the irradiation unit on a basis of the intensity distribution of the energy ray detected by the detector.

13. The three-dimensional modeling apparatus according to claim 1, further comprising a rotation mechanism configured to rotate the stage about an axis along the stacking direction.

14. The three-dimensional modeling apparatus according to claim 1, further comprising a protective film that is provided on the surface of the rigid cylindrical constraining body.

15. The three-dimensional modeling apparatus according to claim 1, further comprising:
an irradiation mechanism configured to radiate a plurality of energy beams as the energy ray; and
a control portion configured to control the irradiation mechanism so that a period of time when all of the plurality of energy beams are being radiated includes a period of time when at least two energy beams of the plurality of energy beams are being radiated simultaneously.

16. The three-dimensional modeling apparatus according to claim 1, wherein the processor is configured to operate a power controller and a movement controller for the irradiation unit, to modulate an irradiation power of the energy ray during movement of the irradiation unit.

17. A method of manufacturing an object using a three-dimensional modeling apparatus, the three-dimensional modeling apparatus including
- a movable stage and a rigid rotatable cylinder comprised of a rigid cylindrical constraining body having a curved rigid surface that includes a linear region oriented along a first direction parallel to an axis of rotation of the rigid cylindrical constraining body, the curved rigid surface having a fixed radius of curvature, and the rigid cylindrical constraining body being arranged so as to be opposed to the stage so that the linear region of the curved surface is closest to the stage, the method comprising:
- rotating the rigid cylindrical constraining body to deliver a material into a slit region formed of a gap between the stage and the linear region, the material being curable by energy of an energy ray from an irradiation unit, wherein a thickness of the material is determined by the gap;
- moving the irradiation unit in a direction parallel to the axis of rotation of the rigid cylindrical constraining body, the irradiation unit being supported for movement in a hollow internal region of the rigid cylindrical constraining by a guide rail;
- irradiating the material with the energy ray by focusing the energy ray to pass as a focused spot through the rigid cylindrical constraining body to the material in the slit region;
- supporting rotation of the rigid cylindrical constraining body using a guide roller;
- operating at least one movement mechanism to move the stage relative to the rigid cylindrical constraining body along a second direction different from the first direction to form a cured layer of the material, wherein operating the at least one movement mechanism comprises placing the stage at a first position along the second direction and at a second position along the second direction, wherein at both the first and second positions the stage is aligned with the rigid cylindrical constraining body along a stacking direction that is different from the second direction; and
- operating the at least one movement mechanism to move the stage relative to the rigid cylindrical constraining body along the stacking direction to create a stack of a plurality of the cured layer of the material.

18. The method according to claim 17, further comprising causing rotating the guide roller using a roller motor.

19. The method according to claim 17, wherein an irradiation power of the energy ray is modulated during the irradiating and while moving the irradiation unit.

* * * * *